| INPUTS | | | OUTPUTS | |
|---|---|---|---|---|
| AUGEND(A) | ADDEND(D) | CARRY IN | CARRY OUT | SUM |
| 0 | 0 | 0 | 0 | 0 |
| 0 | 0 | ? | 0 | ? |
| 0 | 0 | 1 | 0 | 1 |
| 0 | 1 | 0 | 0 | 1 |
| 0 | 1 | ? | ? | ? |
| 0 | 1 | 1 | 1 | 0 |
| 1 | 1 | 0 | 1 | 0 |
| 1 | 1 | ? | 1 | ? |
| 1 | 1 | 1 | 1 | 1 |
| 1 | 0 | 0 | 0 | 1 |
| 1 | 0 | ? | ? | ? |
| 1 | 0 | 1 | 1 | 0 |

INVENTOR
EDWARD H. SUSSENGUTH, JR
BY Elmer Galbiati
AGENT

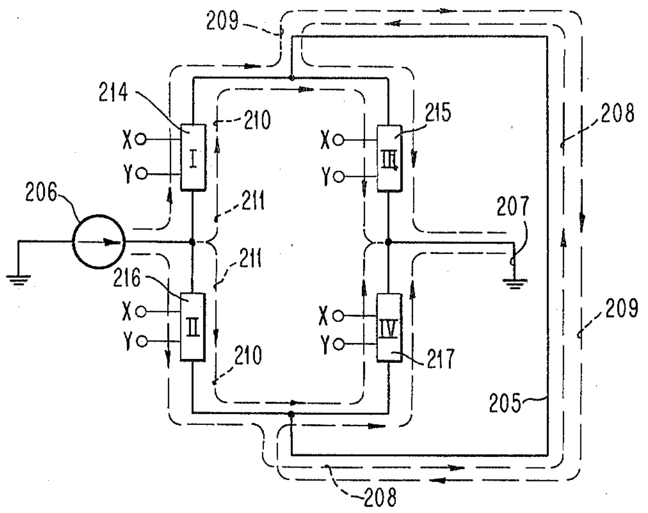
FIG. 2a
| VALUE OF FUNCTION | CURRENT PATH | RESISTIVE CIRCUIT ELEMENTS | SUPERCONDUCTING CIRCUIT ELEMENTS |
|---|---|---|---|
| +1 | 209 | II, III | I, IV |
| −1 | 208 | I, IV | II, III |
| 0 | 210 | I, III | II, IV |
| 0 | 211 | II, IV | I, III |
FIG. 2b
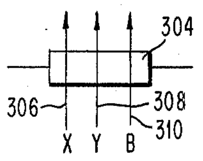
FIG. 3a
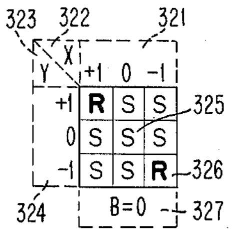
FIG. 3b
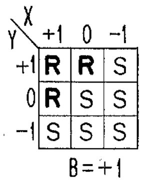
FIG. 3c
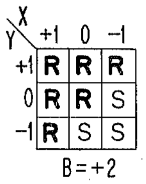
FIG. 3d
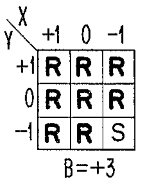
FIG. 3e
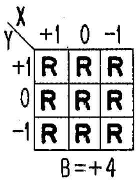
FIG. 3f FIG. 4a
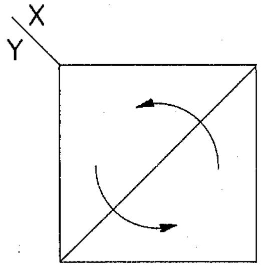
FIG. 4b
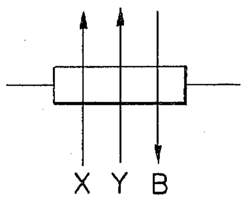
FIG. 4c
| Y \ X | +1 | 0 | -1 |
|---|---|---|---|
| +1 | S | S | S |
| 0 | S | S | R |
| -1 | S | R | R |
B=+1
BIAS CURRENT REVERSED
FIG. 4d
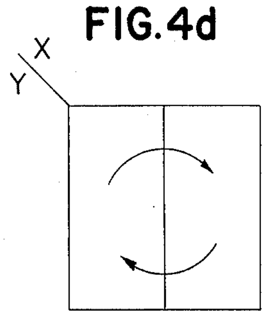
FIG. 4e
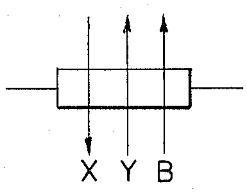
FIG. 4f
| Y \ X | +1 | 0 | -1 |
|---|---|---|---|
| +1 | S | R | R |
| 0 | S | S | R |
| -1 | S | S | S |
B=+1
CURRENT IN X CONTROL REVERSED
FIG. 4g
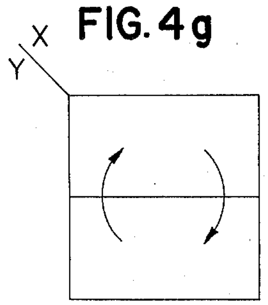
FIG. 4h
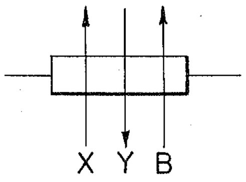
FIG. 4i
| Y \ X | +1 | 0 | -1 |
|---|---|---|---|
| -1 | S | S | S |
| 0 | R | S | S |
| +1 | R | R | S |
B=+1
CURRENT IN Y CONTROL REVERSED

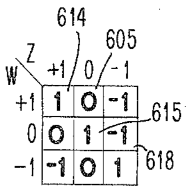
FIG. 6a
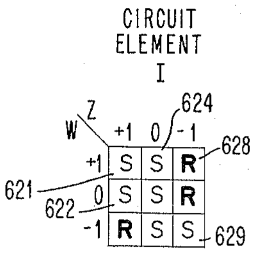
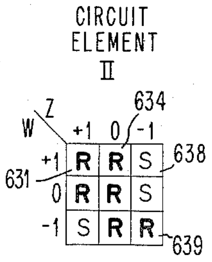
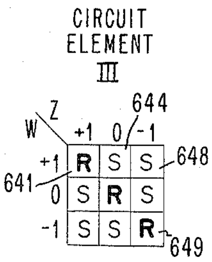
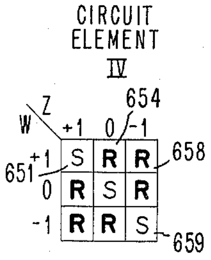
FIG. 6b FIG. 6c FIG. 6d FIG. 6e
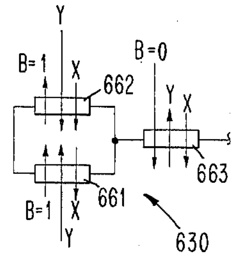
FIG. 6f
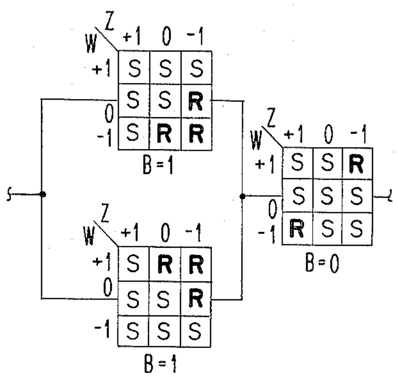
FIG. 6g
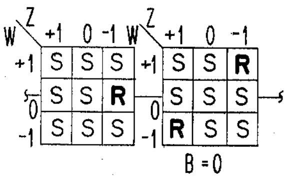
FIG. 6h
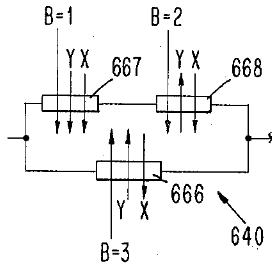
FIG. 6i
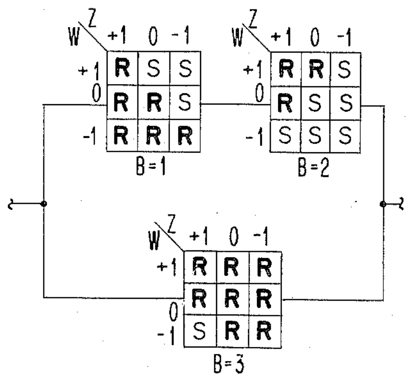
FIG. 6j
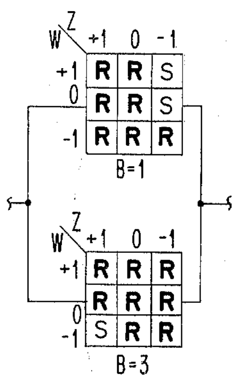
FIG. 6k

A INPUT IN BINARY ONE STATE

A INPUT IN BINARY ZERO STATE

A INPUT IN BINARY ONE STATE

A INPUT IN BINARY ZERO STATE

STATE ONE

STATE TWO 3,244,865

ASYNCHRONOUS BINARY COMPUTER SYSTEM USING TERNARY COMPONENTS

Edward H. Sussenguth, Jr., Arlington, Mass., assignor to International Business Machines Corporation, New York, N.Y., a corporation of New York Filed Sept. 29, 1961, Ser. No. 143,272
8 Claims. (Cl. 235—175)

This invention relates to electronic computers and more particularly to electronic computers which operate asynchronously.

In order for a system to operate asynchronously, there must be some way of determining when each of the components in the system has completed an operation. In a synchronous system each component is allotted a specific amount of time to operate and the output from the device is not sampled until the allotted time has passed. Since the time period allotted is fixed, a sufficiently long time period must be allotted to take care of the worst possible case. Many times a component will have the correct output available long before the end of the allotted period of time. However, in a synchronous system the output of a component is not used until the end of the allotted period of time.

In an asynchronous system each component generates a signal when it has completed an operation. The output of any component can therefore be used for further processing immediately after the component signals that it has completed an operation. Since in an asynchronous system the output of each component is used immediately after the component has finished the operation which it is performing, asynchronous systems are in general faster than synchronous systems. Asynchronous systems in general are well known in the art.

As explained above, in an asynchronous system there must be some means of determining when each component of the system has completed an operation. One feature of the present invention is a novel means of determining when a component in an asynchronous system has completed an operation.

Cryotrons are well known in the art. They have a superconducting control line and a normally superconducting gate conductor. Current in the control line causes the normally superconducting gate conductor to become resistive. The gate conductor has two states, superconducting and resistive, and hence, cryotrons are essentially binary devices.

The output and the input of a ternary devise has three states. These three ternary states may be identified as "zero," "one" and "two," or alternately as "minus one," "zero" and "plus one." Ternary devices have been built which have three input lines and three output lines, each input line and each output line having two conditions to indicate the three ternary states. An example of such circuitry can be found in copending application Serial No. 611,922, filed Sept. 25, 1956 entitled "Multi Purpose Logical Operations" by B. Dunham, now Patent No. 3,028,088 which issued on Apr. 3, 1962. Other ternary devices have one input line and one output line. Three different voltage levels indicate the three different ternary states. An example of this type of circuitry can be found in copending application Serial No. 51,162, filed Aug. 22, 1960 entitled "Logical and Memory Circuit" by H. B. Baskin, now Patent No. 3,129,340 which issued on Apr. 14, 1964.

The present invention provides a ternary device which has a single output line. The three ternary states are indicated on the output line by (1) positive current in the line, i.e., current in a first direction, (2) no current in the line, and (3) negative current in the line, i.e., a current in a second direction.

It is known that ternary devices may be used to implement an asynchronous binary system by using one of the ternary states to indicate that the operation is not complete. For example, with a ternary device which has three voltage levels to indicate the three ternary states, two of the voltage levels are used to indicate the two binary states and the third voltage level is used to indicate that the device has not completed the operation which it is performing.

The novel ternary device of the present invention is used to implement the novel asynchronous binary system which is the principal feature of the present invention. The two ternary states during which current is flowing, that is, when current is flowing in the positive direction and when current is flowing in the negative direction are used to indicate the two binary states. The third ternary state (i.e., when no current is flowing in a line), is used to indicate the null condition. Stated differently, the present invention provides asynchronous binary circuitry wherein the two binary states are represented by positive and negative current in the output line and the null condition (i.e., an indication that the circuit has not completed an operation) is indicated by no current in the output line.

An object of the present invention is to provide an improved asynchronous computing system.

A further object of the present invention is to provide an asynchronous computer system in which valid output signals from the various components of the system may be easily detected.

Another object of the present invention is to provide an improved device for generating any ternary function of two ternary variables.

A further object of the present invention is to provide a device for generating any ternary function of two ternary variables wherein the three ternary states are respectively represented in an output line by positive current, negative current and no current.

Yet another object of the present invention is to provide a cryotronic device for generating any ternary function of two ternary variables wherein the three ternary states are respectively represented in an output line by positive current, negative current and no current.

A still further object of the present invention is to provide an asynchronous binary computing system in which the two binary states are respectively represented by positive and negative current on the various output lines and no current in an output line indicates a null condition.

Yet another object of the present invention is to adapt the ternary device of the present invention to the asynchronous binary computing system of the present invention.

Yet another object of the present invention is to provide an improved asynchronous binary adder.

A still further object of the present invention is to provide an improved asynchronous binary adder in which the end of the addition may be easily detected.

The foregoing and other objects, features and advantages of the invention will be apparent from the following more particular description of preferred embodiments of the invention as illustrated in the accompanying drawings.

In the drawings:

FIGURE 1*a* is a general schematic diagram of the asynchronous binary adder of the present invention.

FIGURE 1b is a table which explains the operation of each bit adder shown in FIGURE 1*a*.

FIGURE 2*a* is a schematic diagram of the general circuit capable of generatiing any ternary function.

FIGURE 2*b* is a table showing which circuit elements are resistive and which are superconducting during the various possible states of the device shown in FIGURE 2*a*.

FIGURE 3a is a schematic diagram of a biased dual control cryotron.

FIGURES 3b to 3f are charts showing the various possible output conditions for the biased dual control cryotron shown in FIGURE 2a.

FIGURES 4a, 4b and 4c are diagrams showing the effect of reversing the referenced direction of the bias current of the cryotron shown in FIGURE 2a.

FIGURES 4d, 4e and 4f are diagrams showing the effect of reversing the reference direction of current in the X control line of the cryotron shown in FIGURE 2a.

FIGURES 4g, 4h and 4i are diagrams showing the effect of reversing the referenced direction of current in the Y control line of the cryotron shown in FIGURE 2a.

FIGURE 6a is a chart which specifies a particular ternary function of two variables W and Z.

FIGURES 6b to 6e are charts which specify the various functions needed in circuits I to IV of the circuits shown in FIGURE 6a in order to realize the function specified by the chart of FIGURE 6g.

FIGURES 6f to 6p are charts showing how the functions specified in FIGURES 6b to 6e may be realized.

FIGURE 6q is a circuit diagram of a circuit which can produce the functions specified by the chart in FIGURE 7a.

The remainder of the specification is arranged as follows: First, a general explanation of the asynchronous binary adder system of the present invention is given with reference to FIGURES 1a and 1b. Second, an explanation of the ternary device with which the asynchronous binary adder system of the present invention is implemented is given. The discussion of the ternary device of the present invention includes a discussion of the notation used. The use of the notation greatly simplifies, shortens and clarifies the subsequent explanation of the invention. The third part of the specification contains a detailed description of the circuitry with which the asynchronous binary system of the present invention is implemented.

The following numbering scheme is used throughout the specification wherever possible. Each component is designated by a three digit number. The numeral in the hundreds digital position of each number which designates a component specifies the particular figure on which the component is located. For example, part 125 is located on FIGURE 1a.

*General description of asynchronous system*

In general, asynscronous computers have a number of components, each of which has an input and an output. The components are arranged in some order with each component (except the first) receiving an input from the output of some other component. Control circuitry is provided such that each component may know when signals appearing at its input are valid data signals and each component signals the control circuitry when the signals appearing at its output are valid data signals. One feature of the present invention is directed at a simplified way of determining when signals appearing on the output of a component are valid data signals.

Figures 1A, 1B:
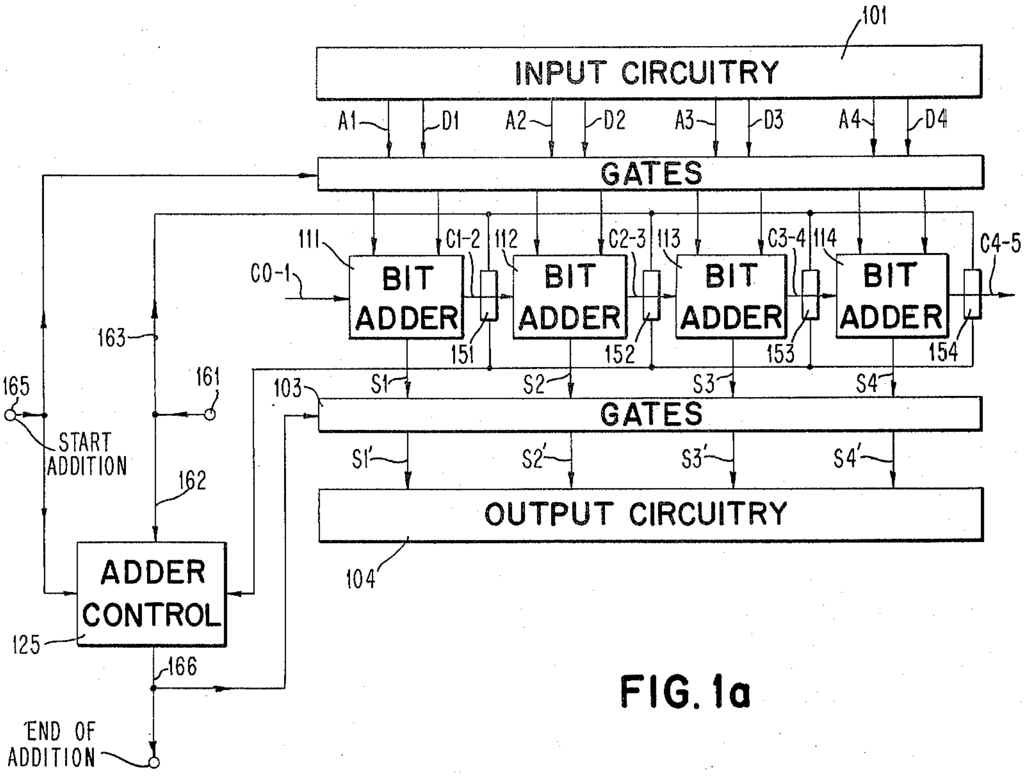

In order to explain the principles of the invention, an asynchronous adding system is shown in FIGURE 1a. The asynchronous adding system shown in FIGURE 1a adds an augend having four digits A1 to A4 to an addend having four digets D1 to D4. The system generates four sum digits S1 to S4.

The system has an input circuit 101, an output circuit 104, four bit adders 111 to 114, gating circuitry 102 and 103 and a control circuit 125. The input circuit 101 supplies the four digits of the augend on the lines A1 to A4 and the four digits of the addend on the lines D1 to D4. The augend and the addend digits are gated from input circuitry 101 through gate 102 to the bit adders 111 to 114 by a signal on the "Start Addition" line 165. The sum digits are gated by a signal on the "End of Addition" line 166 from the output lines S1 to S4 of the bit adders 111 to 114 to the output circuit 104. The input circuit 101 has two registers which store the digits of the augend and the digits of the addend and the output circuit 104 has a register which stores the sum digits.

The operation of each of the bit adders 111 to 114 is specified by the table of FIGURE 1b. Each bit adder receives three signals which represent an augend digit, an addend digit and a carry-in digit, and each adder produces two output signals which represent a carry output and a sum output. The augend digits and the addend digits are gated to circuits 111 to 114 from registers in input circuitry 101 and hence the augend or the addend digits are either in the "one" or the "zero" condition at the beginning of an add operation. The augend and the addend digits are never in the null condition since the start addition line 165 is never activated until after the augend and the addend are in the registers in input circuitry 102. The carry input signal to each bit adder can be either in the zero condition, the one condition or the "null" condition. Likewise the carry output signal and the sum output signal from each bit adder can be either the zero condition, the one condition or the null condition.

The chart of FIGURE 1b specifies what the condition of the output of a bit adder is when the inputs are in the various possible conditions. The null condition is represented in the chart of FIGURE 1b by a question mark. FIGURE 1b will be explained by giving two examples. These examples respectively explain the first and second rows in the chart. (1) When the augend is zero, the addend is zero, and the carry-in is zero, both the carry out and the sum output are zero. (2) When the augend is zero, the addend is zero and the carry-in is in the null condition (the don't know conditions), the carry out is zero and the sum output is null. The reason for the zero on the carry output even though the carry-in is null (don't know) is that regardless of what the carry-in is, if both the augend and addend are zero, the carry output is zero.

The signals on each of the lines C0–1, C1–2, C2–3, C3–4, C4–5 and S1 to S4 are ternary signals which represent binary information. In each of these lines current in a first direction indicates a binary one, current in a second direction indicates a binary zero, and no current in the line indicates a null condition. The manner in which the ternary signals on the various lines are generated will be explained in detail later. In order to understand the system it is merely necessary to realize that when there is current in either direction in one of the lines either a binary one or a binary zero is indicated, and when there is no current in a line it indicates a null condition.

The fact that the null condition is indicated by no current in the various lines and that the binary one and the binary zero conditions are indicated by current in the lines allows the system to have a very simple means of detecting when the various components of the system (i.e., bit adders 111 to 114) have completed an operation and when the outputs of these components indicate valid information.

In the adding system shown herein as in the adding system shown in the prior art, carries propagate between the various bit positions, and the sum outputs in the higher order positions depend on the carries from the lower order positions. Thus, before a valid signal can be generated on line S4 by bit adder 114, bit adder 111 must have produced a carry indication on line C1–2, bit adder 112 must have assimilated the carry indication from line C1–2 and produced a carry indication on line C2–3, bit adder 112 must have assimilated the carry indication from line C2–3 and produced a carry indication on line C3–4 and bit adder 113 must have assimilated the carry indication from line C3–4. Naturally, the carry indications on lines C1–2, C2–3, and C3–4 can either be zero or one; however, there must be an indication on each of the lines as to whether the associated carry is a binary zero or a binary one and this indication must propagate throuugh the various stages.

Before control circuitry 125 can gate the sum digits S1 to S4 to output circuit 104 it must determine that each of the bit adders 111 to 114 has had sufficient time to activate its associated carry output line to indicate that either there is a carry to the next binary position or that there is not a carry to the next binary position. The system includes cryotrons 151, 152, 153 and 154 which detect when each of the bit adders 111 to 114 has activated its associated carry output line. Cryotrons 151, 152, 153 and 154 are made resistive whenever there is either positive or negative current in the respective lines C1–2, C2–3, C3–4 and C4–5. Since, when a bit adder activates its associated carry output line to indicate either a binary one or a binary zero (i.e., either a carry or no carry) there is current in the line in either a positive or a negative direction, the cryotron associated with the carry output line of each bit adder is resistive when the carry output line of the respective bit adder is activated to indicate a carry (i.e., a binary one indicated by current in a positive direction) or to indicate no carry (i.e., a binary zero indicated by current in a negative direction).

A constant current is applied to terminal 161. At the beginning of each addition operation adder control 125 temporarily places a resistance in series with line 162 thereby shifting the current from current source 161 into line 163. Since at the beginning of each add operation lines C1–2 to C4–5 are in the null condition (with no current in each line), cryotrons 151 and 155 are superconducting and current once shifted into line 163 continues to flow therein. After an addition has been started the bit adders 111 to 114 activate lines C1–2 to C4–5 with either a one or a zero signal thereby making cryotrons 151 to 154 resistive. After each of the bit adders 111 to 114 has activated its associated carry output line all of the cryotrons 151 to 154 are resistive and the current from current source 161 is shifted back into line 162. The current in line 162 indicates that the addition is complete.

A particular point of the present invention is the simplicity with which the null state on the output of each component (i.e., on the carry out lines C1–2 to C4–5 of each bit adder 111 to 114) can be detected. The only thing that is needed is a cryotron with a single control. The control for the cryotron is the output line of the device. Whenever the output line (i.e., the control for the cryotron) does not have any current therein and hence whenever the output for the circuit is in the null condition, the cryotron is superconducting. When the circuit produces an output, the control line for the cryotron does have current therein, irrespective of whether the output is a zero or a one and the cryotron becomes resistive, thus indicating that the circuit has produced an output.

Before the detailed circuitry for the bit address 111 to 114 and the detailed circuitry for adder control 125 is explained another aspect of the present invention (i.e., a device for generating any ternary function) will be explained. The device for generating ternary functions is used in the circuitry for bit address 111 to 114.

*Ternary cryotronic device*

A cryotronic circuit for generating any one of the possible ternary functions is shown in FIGURE 2*a*. The circuit shown in FIGURE 2*a* has four circuit elements I, II, III and IV, which are selectively made resistive or superconducting in response to two ternary variables X and Y. The output of the device is provided by line 205. Current in a positive direction in line 205 (i.e., current in the downward direction) indicates the first ternary state, current in the negative direction in output line 205 indicates the second ternary state and no current in the ouput line indicates the third ternary state. Hence, the device has three possible output states which may be called plus one, zero and minus one. The three ternary states +1, −1 and 0 are respectively indicated by positive current in output line 205, negative current in output line 205 and no current in output line 205.

The circuit has a current source 206 and a current sink or current collecting means 207 and a constant amount of current flows between current source 206 and current sink 207. There are four possible paths which current from current source 206 may take to arrive at current sink 207. These paths are shown on FIGURE 2*a* by dotted arrows and respectively numbered 208, 209, 210 and 211. The particular path which current takes from current source 206 to current sink 207 is determined by the state, resistive or superconducting, of the circuit elements I, II, III or IV. The output line 205 may be used as the control line for cryotrons in another circuit (not shown). The condition of the circuit elements I, II, III and IV needed to make current flow in the various paths is tabulated in FIGURE 1*b*. The first column of FIGURE 1*b* tabulates the three possible values of the function. The second column tabulates the current path through which current flows when the function has the values specified in the first column. The third column designates which of the circuit elements must be resistive in order to produce the particular output specified in the first column, and the fourth column specifies the particular circuit elements which must be superconducting in order to produce the particular output specified in the first column.

It should be particularly noted that there are two possible paths which the current may follow when the function has a value of zero. These paths are designated 210 and 211. In order for current to flow in current path 210 circuit elements I and III must be resistive and circuit elements II and IV must be superconducting. In order for current to flow in current path 211, circuit elements II and IV must be resistive and circuit elements I and III must be superconducting. It should be noted that the conditions specified above under which current flows in paths 210 and 211 are mutually exclusive. That is, for the function to have a value of zero, two of the circuit elements must be resistive and two of the circuit elements must be superconducting as specified. If this is not so, there may be a spurious path from current source 206 to current sink 207 through output line 205.

The circuit elements I, II, III and IV are cryotron circuits which are selectively made resistive in response to the variables X and Y. These circuits will be explained in detail later. The nature of the cryotrons which are included in circuit elements I, II, III and IV and a symbology which facilitates an explanation of how the circuit shown in FIGURE 2*a* may be used to generate any possible ternary function will now be explained.

FIGURE 3*a* shows the diagrammatic representation of a dual controlled biased cryoton. The cryotron has a normally superconducting gate conductor 304 and three superconducting control conductors 306, 308 and 310. The normally superconducting gate conductor 304 can be made resistive by the magnetic field generated by current in the control conductors 306, 308 and 310. The current in conductors 306, 308 and 310 respectively represents three variables X, Y and B.

The variables X and Y (i.e., the current in lines 306 and 308) may assume values of +1, 0 or −1. The third variable B is maintained constant with respect to any particular cryotron; however, in any cryotron it may have a constant value of 0, +1, +2, +3, +4, −1, −2, −3 or −4. Hence, with respect to any one particular cryotron the current in line 310 may be regarded as a constant bias current. The cryotron gate conductor 304 is resistive if:

$$(a) \qquad |i_X+i_Y+i_B| \geqq 2$$

where:

$i_X$ is the current in control conductor 306
$i_Y$ is the control current in control conductor 308
$i_B$ is the current in control conductor 310.

The meaning of the above equation can be stated in words as follows: The gate conductor 304 is resistive if the absolute magnitude of the algebraic sum of the currents in the control lines is greater than or equal to two.

The direction of positive current in each of the control lines is shown by the arrow which is located on the control line. A negative current in a control line means that current in the particular control line is flowing in a directio opposite to the direction of the arrow which is located on the control line.

The condition of the gate conductor of a cryotron with respect to the current in the control conductors of the cryotron is described herein with charts such as the chart shown in FIGURE 3*b*. As will be seen each chart such as the chart of FIGURE 3*b* represents a cryotron connected in a particular manner. The chart of FIGURE 3*b* has various parts of the chart enclosed by dotted lines. The dotted boxes are designated by reference characters so that the function of the various parts of the chart may be explained. Naturally, the explanation of the function of the parts of the chart of FIGURE 3*b* is applicable to the other similar charts shown herein.

The particular variables which the coordinates of the chart represent are designated in blocks 322 and 323. The various values which these variables assume are designated in boxes 321 and 324. The plus one, zero and minus one in blocks 321 and 322 respectively represent currents of one unit magnitude in the positive direction, zero current, and current of one unit magnitude in the negative direction in the X and Y control lines. The state of the gate conductor of the particular cryotron which the chart represents is designated by the letters R and S which respectively stand for "resistive" and "superconducting." The letter located at the intersection of any two coordinates specifies the condition of the gate conductor of the cryotron when the variables are in the condition specified by the particular coordinates. The magnitude of bias current applied to the particular cryotron is designated below the chart in block 327. For example, for the cryotron specified by the chart in FIGURE 3*b*, the magnitude of the bias current is zero.

The following two examples show how the chart in FIGURE 3*b* specifies the condition of a cryotron. (1) The S in block 325 is located at the intersection of the coordinates X equals zero and Y equals zero. We observe by noting the number in block 327 that the biased current applied to the cryotron is also zero. Since the current in the X control is zero, the current on the Y control is zero and the bias current is zero, the algebraic sum of the currents in the control conductors of the cryotron is zero. Naturally, the absolute magnitude of zero is less than two, and hence according to Equation (a) above the cryotron is superconducting. The S in block 325 therefore indicates that the gate conductor of the cryotron is superconducting when the bias is zero and both of the variables X and Y are zero. (2) The R in block 326 is located at the intersection of the coordinates X equals minus one and Y equals minus one. Since the current in the X control is minus one, the current in the Y control is minus one, and the bias current is zero the algebraic sum of the currents is minus two. The absolute magnitude of minus two is equal to two and hence according to Equation (a) above the gate conductor is resistive. The R in block 326 therefore indicates that the gate conductor of the cryotron is resistive when the bias is zero and when both of the variables X and Y equal minus one.

The charts of FIGURES 3*c*, 3*d*, 3*e* and 3*f* respectively show conditions under which the cryotron gate 304 of FIGURE 2*a* is resistive and superconducting when the bias current has values of +1, +2, +3 and +4. The chart of FIGURE 3*f* is applicable to a cryotron with a bias current of four units of current or with a bias current greater than four units of current.

The effect of reversing the positive reference direction of the bias current in a cryotron is shown in FIGURE 4*a*. By reversing the positive reference direction of the bias current one essentially produces a mirror image about the diagonal of the chart which previously specified the condition of the gate conductor of the cryotron. For example, if the positive reference direction of the bias current applied to the cryotron shown in FIGURE 3*a* is reversed, the circuit diagram representation of the cryotron then appears as shown in FIGURE 4*b*. The charts which specify the operation of the cryotron shown in FIGURE 4*b* are diagonal mirror images of the charts which specify the operation of the cryotron shown in FIGURE 3*a*. The chart which specifies when the cryotron shown in FIGURE 4*b* is resistive and when it is superconducting if the bias is plus one is shown in FIGURE 4*c*. This chart is a mirror image of the chart of FIGURE 3*c*. It should be noted that though the bias current is specified as plus one in both the chart of FIGURE 3*c* and the chart of FIGURE 4*c* the actual current direction of the bias is reversed since the positive reference direction of the current is reversed.

The effect of reversing the positive reference direction of the current in the X control line of a cryotron is shown in FIGURE 4*d*. By reversing the positive reference direction of the current in the X control line one produces a mirror image about the vertical diagonal of the chart which previously specified the condition of the gate conductor of the cryotron. For example, if the positive reference direction of current in the X control line of the cryotron shown in FIGURE 3*a* is reversed, thereby producing a cryotron the diagrammatic representation of which is shown in FIGURE 4*e*, and if a bias of plus one is maintained a chart which is a mirror image about the vertical diagonal of the chart shown in FIGURE 3*c* results. Such a chart is shown in FIGURE 4*f*.

The effect of reversing the positive direction of the current in the Y control line of a cryotron is shown in FIGURE 3*g*. By reversing the positive direction of the current in the Y control line one essentially produces a mirror image about the horizontal diagonal of the chart which previously specified the condition of the gate conductor of the cryotron. For example, if the positive direction of the current in the Y control line of the cryotron shown in FIGURE 3*a* is reversed thereby resulting in a cryotron the diagrammatic representation of which is shown in FIGURE 4*h* and if a bias plus one is maintained a chart which is a mirror image about the horizontal axis of the chart shown in FIGURE 3*c* results. Such a chart is shown in FIGURE 4*i*.

The charts which represent cryotrons connected in series and in parallel will now be explained. When the gate conductors of two cryotrons are connected in series the composite chart of the circuit which includes both cryotrons is a chart which combines the R's which are in both of the charts which specify the individual cryotrons. The reason for this is that if one cryotron in a series circuit is resistive the entire circuit appears to be resistive. Conversely, if the gate conductors of two cryotrons are connected in a parallel the chart representing the circuit which includes both cryotrons is a chart which contains the S's from both of the charts which specify the individual cryotrons. The reason for this is that if one path of a parallel circuit is superconducting the entire circuit appears to be superconducting.

There are five hundred and twelve possible different charts. This includes every possible combination and configuration of R's and S's. The number five hundred and twelve is arrived at because there are nine positions in a chart and each of these nine positions may have an R or an S. Hence, the total number of possible charts is two raised to the ninth power or five hundred and twelve. The following discussion shows that for any one of the possible five hundred and twelve charts there is a corresponding biased dual control cryotron circuit which has the characteristics specified by the chart. The reason that the fact that there is a cryotron circuit for each of the possible five hundred and twelve charts is shown here is so that later it can be used to show that with the present invention any one of the possible nineteen thousand six hundred and eighty-three ternary functions of two ternary variables can be generated. In order to show that there is a circuit for each of the five hundred and twelve possible charts the following discussion shows that there is a circuit for charts which have a single R in each possible location. By combining in series and parallel circuits, the charts of which have a single R in various positions, a circuit which is defined by any one of the five hundred and twelve possible charts can be produced.

Figure 5B:
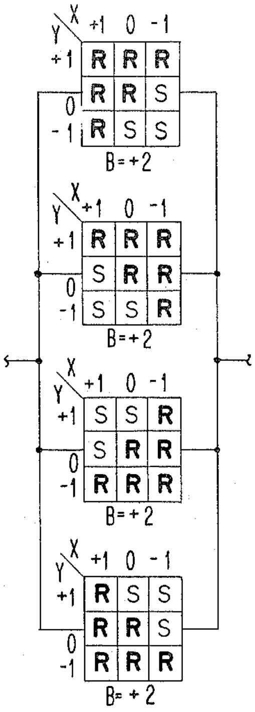
FIGURES 5a to 5i are charts and circuit diagrams which are used to show that every possible output function may be realized by interconnecting several cryotrons.
Figure 5C:
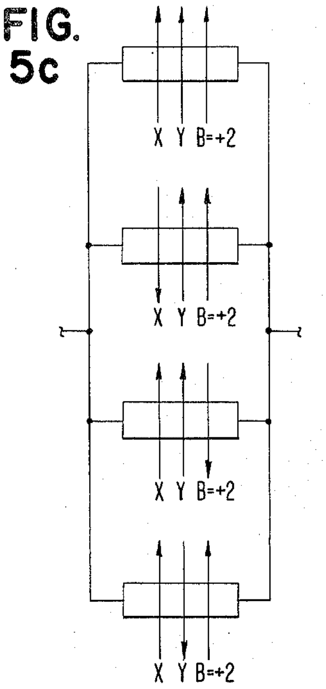
Figure 5A:
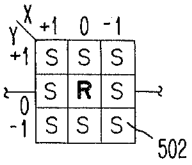

FIGURES 5*a* to 5*i* are used to show that there is a circuit for charts which have a single R in any location on the chart. FIGURE 5*b* shows four charts connected in parallel. A combination of S's from the four charts shown connected in parallel in FIGURE 5*b* produces the chart with a single R in the center as shown in FIGURE 5*a*. By examining the charts shown in FIGURE 5*b* it can be seen that the only position in which an R appears in each of the four charts is the center position. Since as previously explained a parallel circuit is represented by a chart which combines all the S's of the charts for the various parallel branches, the chart of FIGURE 5*a* results. The cryotrons which the connected charts of FIGURE 5*b* represent are shown in FIGURE 5*c*.

Figure 5E:
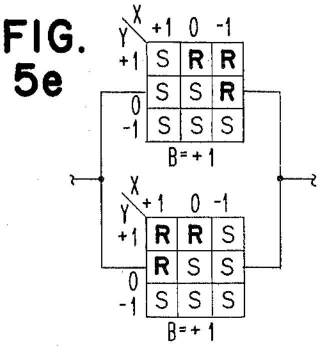
Figure 5F:
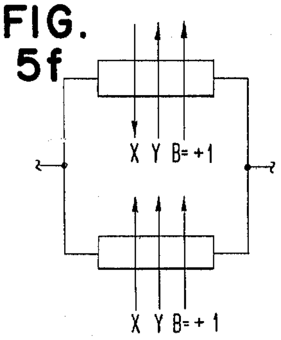
Figure 5D:
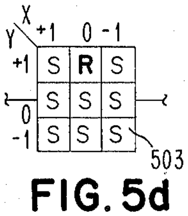

FIGURE 5*e* shows two charts connected in parallel. A combination of S's from the two charts shown connected in parallel in FIGURE 5*e* produces the chart with the single R shown in FIGURE 5*d*. The cryotrons which the connected charts of FIGURE 5*e* represent are shown in FIGURE 5*f*. As previously discussed by reversing the reference direction of positive current in the X control line of a cryotron, a cryotron which has a chart which is the image about the horizontal axis of the chart which previously described the cryotron can be produced. Hence, by reversing the reference direction of positive current in the X control line in each of the cryotrons shown in FIGURE 5*f* a chart with a single R in the center position of the bottom row may be produced. Such a chart would be similar to the chart of FIGURE 5*d*; however, it would be revolved around a horizontal axis in the center of the chart. As previously explained by reversing the reference direction of positive current in the bias line of a cryotron, a cryotron the chart of which is the image about the slanted diagonal of the chart which previously described the cryotron can be produced. Hence, by reversing the reference direction of the bias current of the cryotrons in circuits the charts of which have a single R in the center of the bottom row or a single R in the center of the top row, circuits the charts of which have a single R in the center of the first or in the center of the last column can be produced.

Figure 5G:
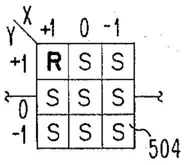
Figure 5H:
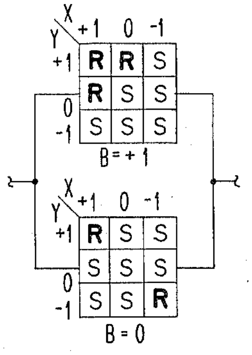
Figure 5I:
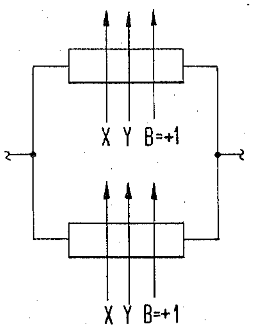

FIGURE 5*h* shows two charts connected in parallel. A combination of the S's from the two charts shown connected in parallel in FIGURE 5*h* produces a chart with a single R in the upper left hand corner as shown in FIGURE 5*g*. The cryotron circuit which the connected chart of FIGURE 5*h* represents is shown in FIGURE 5*i*. By selectively reversing the reference direction of the positive current in the X and Y control lines of the cryotrons shown in FIGURE 5*i*, cryotron circuits, the charts of which have a single R in each of the four corners may be produced.

The above has shown that by connecting a plurality of cryotrons in parallel a circuit can be obtained, the chart representation of which has a single R in any particular position in the chart. Since circuits connected in series have charts which include the R's from each of the charts which define the series connected elements in the circuit, circuits can be obtained the charts of which have any particular configuration of R's by connecting a plurality of circuits in series. Thus, the above has shown that a circuit can be obtained for any one of the possible five hundred and twelve different chart configurations.

The devices described thus far have two output states; resistive and superconducting. The output of a ternary device has three states which may be called zero, one and two or alternately minus one, zero and plus one. A chart which represents a ternary device therefore has three possible symbols at each intersection of its coordinate. Herein the symbols +1, 0 and −1 are used to indicate the three output states of a ternary device. For example, the chart of FIGURE 6*a* specifies the condition of a ternary function of two ternary variables W and Z. The ternary variables W and Z each have three possible states +1, 0 and −1. Likewise, for any particular state of the inputs, the condition of the function is specified as one of the three states +1, 0 and −1. For example, if the variable W is +1, and the variable Z is 0, the function is 0 as specified by the 0 in position 605. If the variable W is 0 and the variable Z is 0, the function has a value of +1 as specified in position 615. Finally, if the variable W has a value of 0 and the variable Z has a value of −1, the function has a value of −1 as specified by the −1 in block 618. For each other possible condition of the input variable W and Z, the condition of the function is specified by the chart at the intersection of the coordinates corresponding to the particular values of the variables. Since each position in the chart has three possible conditions −1, 0 and +1, there are three raised to the ninth power or nineteen thousand six hundred and eighty three possible different charts. That is, there are nineteen thousand six hundred eighty three different ternary functions of two ternary variables. The nineteen thousand six hundred and eighty three different ternary functions correspond to each possible different chart (such as the chart of FIGURE 6*a*) which is possible. For the sake of brevity, the particular circuit configurations needed to generate each of the nineteen thousand six hundred and eighty three ternary functions is not explained in detail herein. The present invention consists of the general circuit configuration which is capable of generating any one of the possible nineteen thousand six hundred and eighty three functions. The invention is taught herein by explaining in detail a circuit for generating one particular ternary function and then it is shown that the general circuit configuration is capable of generating any one of the other possible nineteen thousand six hundred and eighty two functions.

Some of the nineteen thousand six hundred and eighty three functions are trivial and certain other functions could be elimniated due to symmetry. However, irrespective of the functions which could be eliminated there still is a substantial number of functions which remain and a complete exposition of the details of the circuitry needed to generate each of these functions would serve no useful purpose. The invention relates to a circuit shown in FIGURE 2*a* and previously explained which is capable of generating any one of the ternary functions and the invention is adequately and completely explained by merely showing the detailed circuitry for generating one of the functions and by then going on to show how this circuitry can be modified to generate any one of the other possible nineteen thousand six hundred and eighty two functions.

As previously explained, the circuit shown in FIGURE 2*a* is a general circuit which is capable of generating any one of the possible ternary functions. The detailed circuitry needed in circuit elements I, II, III and IV of the circuit shown in FIGURE 2*a* so that the circuit of FIGURE 2*a* will generate the one particular ternary function specified by the chart shown in FIGURE 6*a* will now be explained in detail.

The chart of FIGURE 6*a* specifies the value of a particular function of two variables W and Z for each possible condition of the variables. From the chart specifying the value of the function under the various possible conditions of the variables, charts which specify the condition of the various circuit elements I, II, III and IV for the various conditions of the input variables are obtained. The charts of FIGURES 6*b*, 6*c*, 6*d* and 6*e* respectively specify the conditions of the circuit elements I, II, III and IV for the various possible conditions of the input variables W and Z. That is, in order for the circuit shown in FIGURE 2*a* to generate on output line 105 the function specified by the chart of FIGURE 6*a*, the circuit elements I, II, III and IV must be resistive or superconducting as specified by the charts of FIGURES 6*b* to 6*e*.

The relationship between the charts of FIGURES 6*b*, 6*c*, 6*d* and 6*e* and the charts of FIGURE 6*a* will now be explained. The chart of FIGURE 6*a* shows that when the input variable W has a value of +1 and the input variable Z has a value of +1, the function has a value of +1 as specified by the +1 in the block 614. By examining FIGURE 2*b*, we note that in order for the function to have a value of +1, the current must flow in current path 209 and the circuit elements II and III must be resistive and the circuit elements I and IV must be superconducting. Blocks 621, 631, 641 and 651 respectively specify the condition of the circuit elements I, II, III and IV when the variables each have a value of +1. In order for the function to have the value specified by the chart of FIGURE 6*a* when the variables each have a value of +1, i.e., in order for current to flow in current path 209 when the variables each have a value of +1, there must be an S in block 621, an R in block 631, an R in block 641 and a S in block 651.

As specified in block 605 in the chart of FIGURE 6*a*, the function has a value of 0 when the input variable W has a value of +1 and the input variable Z has a value of 0. In order for the function to have a value of 0, we note by examining the chart of FIGURE 2*b* that either one of two possible conditions may prevail. We may choose either one of these conditions and for the example shown here, we have chosen the second condition. That is, when the input variable W equals +1 and the input variable Z equals 0, current will flow in superconducting path 211. Hence, circuit elements I and III are superconducting and circuit elements II and IV are resistive. Since circuit elements I and III are superconducting when the input variable W has a value of +1 and the input variable Z has a value of 0 an S is located in block 624 and 644 of the charts of FIGURES 6*b* and 6*d* and since circuit elements II and IV must be resistive when the input variable W has a value of +1 and the input variable Z has a value of 0, and R is placed in blocks 634 and 654 of the charts of FIGURES 6*c* and 6*e*. The chart of FIGURE 6*a* specifies that the function has a value of −1 when the input variable W has a value of 0 and the input variable Z has a value of −1. By examining the chart of FIGURE 2*b*, we note that in order for the function to have a value of −1, the circuit elements I and IV must be resistive and the circuit elements II and III must be superconducting. Hence, an R is located in blocks 628 and 658 of the charts of FIGURES 6*b* and 6*e* and an S is placed in blocks 638 and 648 of the charts of FIGURES 6*c* and 6*d*. For each of the other conditions of the function as specified by the chart of FIGURE 6*a*, the condition of the circuit elements I, II, III and IV is determined from the chart of FIGURE 1*b*. Thus, the entire charts as shown in FIGURES 6*b* to 6*e* are obtained from the chart of FIGURE 6*a*.

Circuits which have the characteristics specified by the charts of FIGURES 6*b* to 6*e* are possible, since it was previously shown that it is possible to obtain a circuit element which has any possible chart configuration. The specific circuits which have the characteristics specified by the charts of FIGURES 6*b*, 6*c*, 6*d* and 6*e* are respectively shown in FIGURES 6*f*, 6*i*, 6*l* and 6*n*.

Three cryotrons respectively designated 661, 662 and 663 are connected together as shown in FIGURE 6*f* to produce a circuit which has the characteristics specified by the chart of FIGURE 6*b*. The charts which specify the characteristics of the cryotrons 661, 662 and 663 are shown connected in FIGURE 6*g*. A chart which shows the characteristic of the parallel circuit which includes cryotron 661 and 662 is shown in FIGURE 6*h* connected in series with a chart which specifies the characteristics of cryotron 663. As previously explained, if two cryotrons are connected in parallel, the chart which defines the characteristics of the parallel circuit is a chart which combines the S's from the charts which specify the individual cryotrons, and if two cryotrons are connected in series, the chart which defines the characteristics of the series circuit is a chart which includes the R's from the charts which specify the individual elements. Hence, the left-hand chart in FIGURE 6*h* merely combines the S's from the charts shown connected in parallel in FIGURE 6*g*. Furthermore, the chart of FIGURE 6*b* which shows the characteristics of the entire circuit 630 merely combines the R's from the two charts shown connected in series in FIGURE 6*h*.

Three cryotrons 666, 667 and 668 are connected as shown in FIGURE 6*i* in order to produce a circuit which has the characteristics specified by the chart of FIGURE 6*c*. The characteristics of the three cryotrons 666, 667 and 668 is given by the three connected charts shown in FIGURE 6*j*. The combined characteristics of cryotrons 667 and 668 is shown by the top chart in FIGURE 6*k*. The top chart in FIGURE 6*k* combines the R's from the two charts shown connected in series in FIGURE 6*j*. The combined characteristics of the overall circuits as specified by the chart of FIGURE 6*c* may be arrived at by combining the S's of the charts shown connected in parallel in FIGURE 6*k*.

Figure 6L:
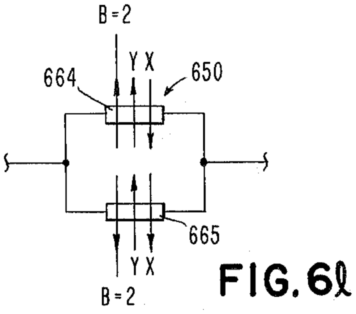
Figure 6M:
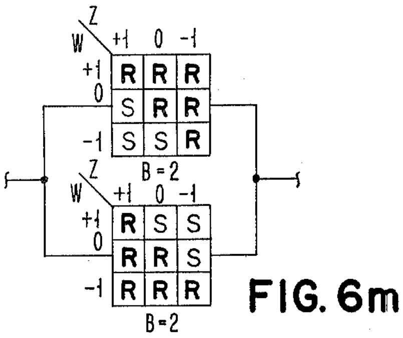

Two cryotrons 664 and 665 are connected in parallel as shown in FIGURE 6*l* in order to produce a circuit which has the characteristics specified by the chart of FIGURE 6*d*. The characteristics of the cryotrons 664 and 665 are shown by the connected charts of FIGURE 6*m*. A combination of the S's from the two charts shown connected in parallel in the chart of FIGURE 6*m* produces the chart of FIGURE 6*d*.

Figure 6N:
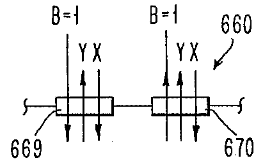
Figure 6P:
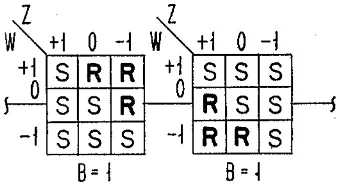

Two cryotrons 669 and 670 are connected in series as shown in FIGURE 6*n* in order to produce a circuit which has the characteristics specified by the chart of FIGURE 6*e*. The charts shown connected in series in FIGURE 6*p* specify the characteristics of the cryotrons 669 and 670. The chart of FIGURE 6*e* combines the S's of the two charts shown connected in FIGURE 6*p*.

Figure 6Q:
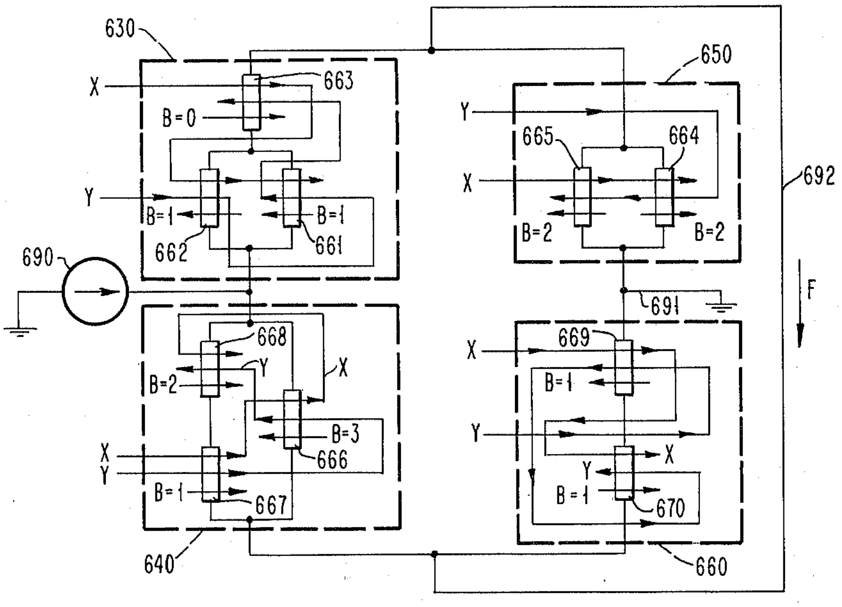

Circuits 630, 640, 650 and 660 which are shown in FIGURES 6*f*, 6*i*, 6*l* and 6*n* respectively form circuit elements I, II, III and IV of the circuit shown in FIGURE 2*a* and the circuit of FIGURE 2*a* thereby generates the ternary function specified by the chart of FIGURE 6*a*. Circuit elements 630, 640, 650 and 660 are shown in FIGURE 6*q* connected in the circuit of FIGURE 2*a*. FIGURE 6*q* is a circuit diagram of a circuit for generating the ternary function specified by the chart of FIGURE 6*a*. The circuit shown in FIGURE 6*q* has a current source 690, a current sink 691, four circuit elements 630, 640, 650 and 660 and an output line 692. Current source 690 supplies a constant amount of current, and this current passes through a selected two of the circuit elements 630, 640, 650 and 660 to the current sink 691. The particular path which the current from current source 690 takes to current sink 691 depends upon which of the circuit elements 630, 640, 650 and 660 are resistive and which of the circuit elements are superconducting. If circuit elements 630 and 660 are superconducting and circuit elements 650 and 640 are resistive, current from current source 690 passes through circuit element 630, through output line 692 (in the downward or positive direction) through circuit element 660, to current sink 691. If circuit elements 640 and 650 are superconducting and circuit elements 630 and 660 are resistive, the current from current source 690 passes through circuit element 640, through output line 692 (in the upward or negative direction), through circuit element 650, to current sink 691. If current elements 630 and 650 are superconducting and circuit elements 640 and 660 are resistive, the current from current source 690 passes through circuit elements 630 and 650 to the current sink 691 without passing through the output line 692. If circuit elements 640 and 660 are superconducting and circuit elements 630 and 650 are resistive, the current from current source 690 passes through circuit elements 640 and 660 to current sink 691 without passing through output line 692. The particular conditions under which the circuit elements 630, 640, 650 and 660 are resistive and the particular conditions under which they are superconducting is respectively specified by the charts of FIGURES 6*b*, 6*c*, 6*d* and 6*e*. The overall operation of the circuits shown in FIGURE 6*q* is specified by the chart of FIGURE 6*a*.

The foregoing has shown the specific circuitry needed in circuit elements I, II, III and IV of the circuit shown in FIGURE 2*a* in order to generate the specific ternary function specified by the chart of FIGURE 6*a*. The circuit shown in FIGURE 2*a* is a general circuit capable of generating any one of the possible nineteen thousand six hundred and eighty three ternary functions; however, the circuit shown in FIGURE 2*a* has several parameters therein (i.e., the specific configuration of elements I, II, III and IV) which must be established based upon the particular function which the circuit is to generate. For any particular ternary function, the previous discussion has shown how charts describing the overall characteristics of each of the circuit elements I, II, III and IV can be obtained. Furthermore it has been shown that for any particular chart there is a circuit which has the characteristics shown by the chart. Hence, the manner of obtaining the charts which describe the particular circuit elements I, II, III and IV needed to generate any one of the possible nineteen thousand six hundred and eighty three ternary functions has been shown and it has also been shown that there is a particular circuit configuration which has the characteristic defined by any particular chart. The previous discussion has thus shown that the circuit of FIGURE 2*a* can generate any one of the possible nineteen thousand six hundred and eighty three ternary functions.

The particular construction of the cryotrons which are herein merely shown symbolically is not relevant to the present invention. The cryotrons may be either wire wound cryotrons, cross film cryotrons or in-line cryotrons. An example of the construction of a crossfilm cryotron may be found in application Serial No. 79,824 filed Dec. 30, 1960 by John R. Anderson entitled "Superconducting Transmission Line Circuit," now Patent No. 3,191,056 which issued on June 22, 1965 and an example of an in-line cryotron may be found in application Serial No. 133,528 filed Aug. 23, 1961 by Norman H. Meyers and Charles J. Bertuck entitled "Superconditioning In-Line Gating Device and Circuitry," now Patent No. 3,145,310 which issued on Aug. 18, 1964.

*Detailed description of asynchronous binary adder*

The overall operation of the asynchronous binary adder shown in FIGURE 1*a* was previously described. This section of the specification will describe in detail the circuitry which is in each of the bit adders 111 to 114, the adder control 125, input circuitry 101, and the gates 102 and 103. The output circuitry 104 is not described in detail. It may consist of conventional indicating devices or other computing apparatus.

Figure 9B:
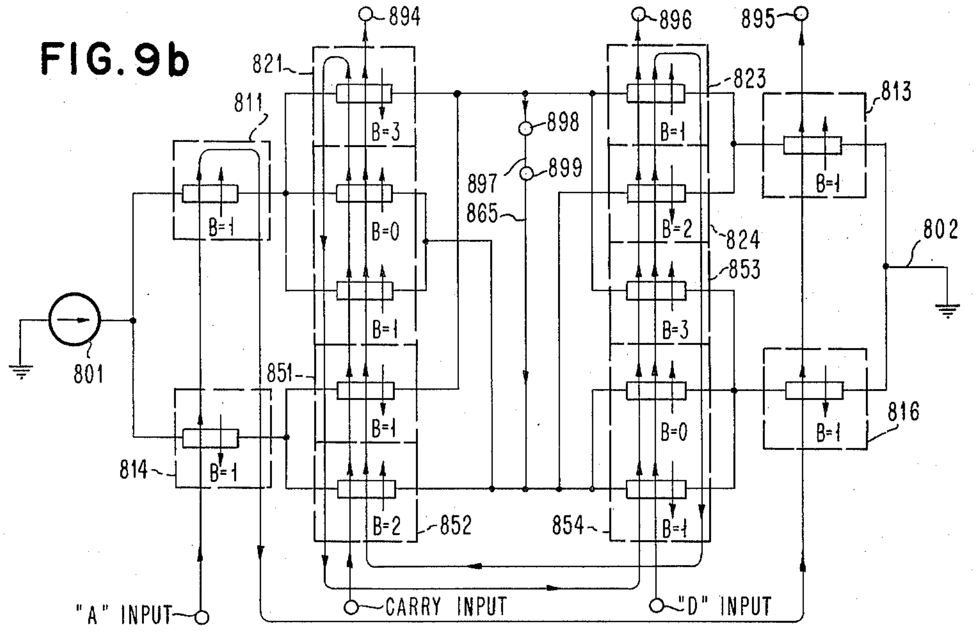
FIGURE 9b is a circuit diagram of a circuit which can generate the carry function as specified by the charts of FIGURES 7a and 7b.
Figure 10A:
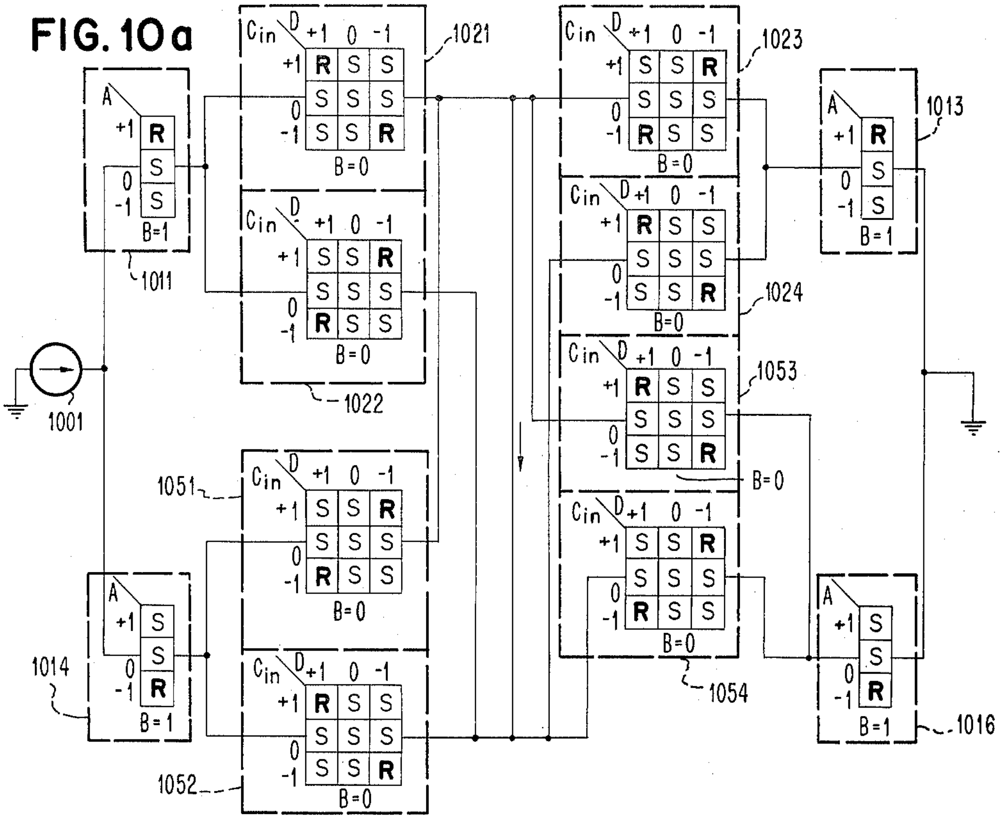
FIGURE 10a is a diagram showing the functions needed in the various blocks shown in FIGURE 8b in order to produce the binary sum output specified by the charts of FIGURES 7c and 7d.
Figure 10B:
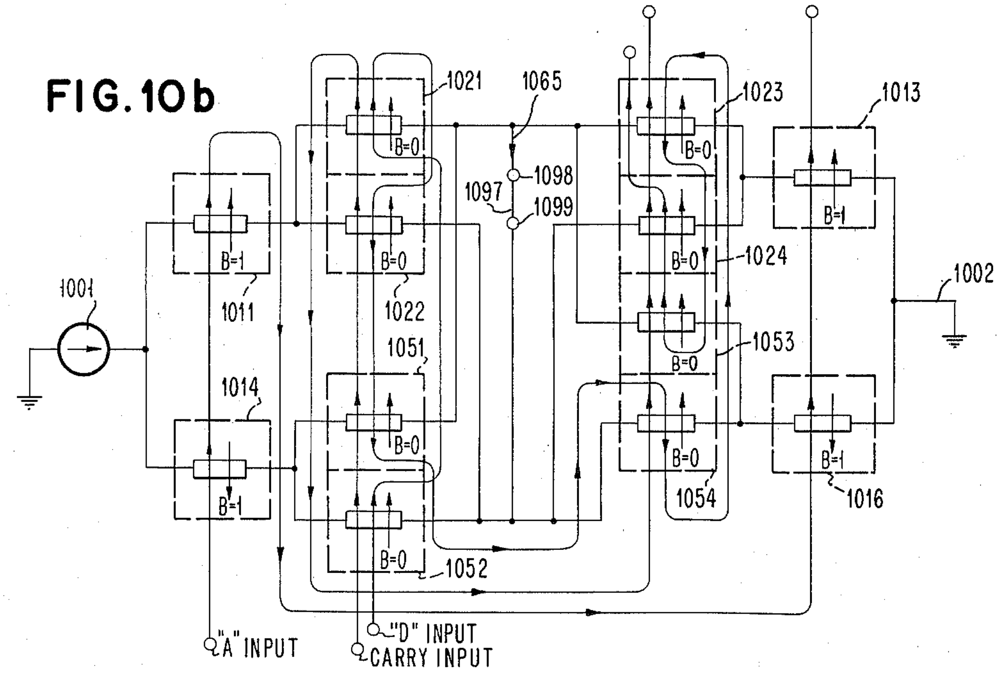
FIGURE 10b is a circuit diagram showing a circuit capable of generating the binary sum digits as specified by the charts of FIGURES 7c and 7d.

Each of the bit adders 111 to 114 is identical and hence the following description is equally applicable to each of the bit adders 111 to 114. The circuitry in each bit adder is divided into two parts. The first part of the circuitry is used to generate the carry output and the second part of the circuitry is used to generate the sum output. The circuitry which generates the carry output is shown in FIGURE 9*b* and the circuitry which generates the sum output is shown in FIGURE 10*b*.

As previously explained, the operation of each bit adder is explained by the table in FIGURE 1*b*. Each bit adder receives three input signals and produces two output signals. The three input signals which each bit adder receives represent one bit of the augend, one bit of the addend and a carry-in signal. The two outputs produced by each bit adder represent a carry output signal and a sum output signal.

The chart of FIGURE 1*b* specifies the carry output and the sum output as either a binary zero, a binary one, or null. The null condition is indicated by a question mark. As previously explained when an output is in the binary one state, there is positive current in the output line, when an output is in the binary zero state there is negative current in the particular output line and when an output is in the null condition there is no current in the output line. The charts of FIGURES 7*a* and 7*b* specify the condition of the current in the carry output line of a bid adder when the inputs are in the various possible conditions. The chart of FIGURE 7*a* specifies the condition of the current in the carry output line of a bit adder when the augend digit input (the A input) is in the binary one state and the carry input and the addend input (the D input) take on the various possible conditions. The chart of FIGURE 7*b* specifies the condition of the current in the carry output line of a bit adder when augend digit (the A input) in the binary zero state and the carry input and the addend input (the D input) take on the various possible conditions. Stated differently, the charts of FIGURES 7*a* and 7*b* break the chart of FIGURE 1*b* into two parts. The chart of FIGURE 7*b* relates to that half of the chart of FIGURE 1*b* wherein the augend digit (the A input) is a binary zero and the chart of FIGURE 7*a* relates to that half of the chart of FIGURE 1*b* wherein the augend input (the A input) is a binary one. For the condition where the A input is a binary zero, the chart of FIGURE 7*b* specifies the condition of the current in the carry output line for the various possible conditions of the current in the carry input line and the D input line. Likewise for the condition where the A input is a binary one, the chart of FIGURE 7*a* specifies the condition of the current in the carry output line for the various possible conditions of the current in the carry input line and in the D input line.

Figure 7A:
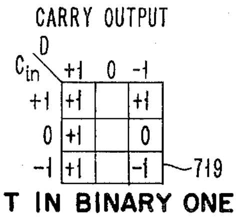
FIGURES 7a to 7d are charts showing the ternary functions which specify the sum and carry digits for a binary adder.
Figure 7B:
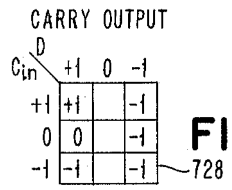

It should be particularly noted that the plus ones, the zeroes and the minus ones of the charts of FIGURES 7*a* and 7*b* relate to the condition of current in a line, whereas, in the chart of FIGURE 1*b* the zeros, plus ones, and question marks relate to binary quantities. Thus in the charts of FIGURES 7*a* and 7*b* a plus one indicates a binary one, a zero indicates a null condition and a minus one indicates a binary zero. Since for the function specified by the charts of FIGURES 7*a* and 7*c* the A input is in the binary one state, the function specified by the charts of FIGURES 7*a* and 7*c* is only generated when the A input has positive current therein, and since for the function specified by the charts of FIGURES 7*b* and 7*c* the A input is in the binary zero state, the function specified by the charts of FIGURES 7*b* and 7*c* is only generated when the A input has negative current therein.

The manner in which the charts of FIGURES 7*a* and 7*b* specify the condition of the current in the carry output line is indicated by the following examples. The +1 in block 711 of the chart of FIGURE 7*a* indicates that there is positive current in the carry output line when there is positive current in the carry input line, positive current in the D input line and positive current in the A input line. The −1 in block 719 of the chart of FIGURE 7*a* indicates that the current in the carry output line is negative when there is negative current in the carry input line, negative current in the D input line and positive current in the A input line. This is similar to the manner in which the chart of FIGURE 6*a* specified a ternary function.

Since the D input is never in the null condition (there is never zero current on the addend input line while the circuit is operating), the charts of FIGURES 7*a* and 7*b* have blank spaces in their center columns. The reason that the A and D inputs are never in the null condition is that at the beginning of an addition the augend and the addend are stored in registers in input circuitry 101. The gates 102 are never activated until there is either a one or a zero stored in each position of each register in input circuitry 101.

Figure 7C:
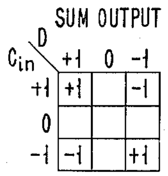
Figure 7D:
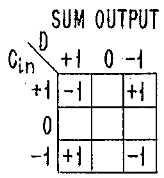

The charts of FIGURES 7*c* and 7*d* are similar to the charts of FIGURES 7*a* and 7*b*; however, the charts of FIGURES 7*c* and 7*d* relate to the condition of the current in the sum output line of a bit adder. The chart of FIGURE 7*c* specifies the condition of the current in the sum output line of a bit adder for the various possible conditions of current in the carry input line and the D input line when the A input line is in the binary one condition, and the chart of FIGURE 7*d* specifies the condition of the current in the sum output line of a bit adder for the various possible conditions of current in the carry input line and in the D input line when the A input line is in the binary zero condition.

The sum outputs S1 to S4 from bit adders 111 to 114 are not gated through gate 103 to output circuitry 104 until each of the bit adders 111 to 114 has completed its addition. Hence, at the time that the S1 to S4 outputs are gated to the output circuitry 104, none of the outputs S1 to S4 can possibly be in the null condition. For this reason, the circuitry which generates the sum outputs is less complicated than the circuitry which generates the carry outputs. The simplification of the circuitry which generates the sum output is reflected in the charts of FIGURES 7*c* and 7*d*. The center column and the center row of the charts of FIGURES 7*c* and 7*d* are blank. This indicates that the value of the function for those instances where either the D input or the carry input is in the null condition is irrelevant. It should be particularly noted that the function specified by the charts of FIGURES 7*c* and 7*d* are not necessarily in the null condition (i.e., with no current in their output lines) in those instances where blanks are left in the charts of FIGURES 7*c* and 7*d*. The blanks in the charts of FIGURES 7*c* and 7*d* indicate that the value which the function assumes in those instances is irrelevant.

The charts of FIGURES 7*a*, 7*b*, 7*c* and 7*d* specify ternary functions of the two ternary variables, carry input and D input. Hence, using the circuit previously described which generates a ternary function, circuits for generating the functions specified by the charts of 7*a*, 7*b*, 7*c* and 7*d* can be obtained.

Figure 8A:
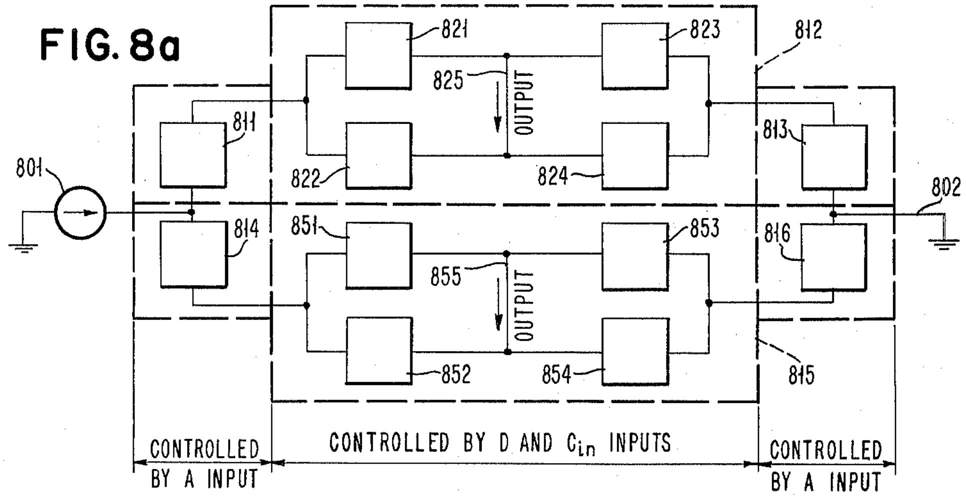
FIGURE 8a is a general schematic diagram of a circuit which can produce the functions specified by the charts of FIGURES 7a to 7d.

It must be noted however, that the circuit for generating the carry output as well as the circuit for generating the sum output must have two parts. The first part is operative when the A input has a value of binary one and the second part is operative when the A input has a value of binary zero. A general schematic diagram of the circuit used to generate the carry output and the sum output signals is shown in FIGURE 8*a*. The circuit of FIGURE 8*a* has a current source 801, a current sink 802, two output lines 825 and 855 and six circuit elements 811, 812, 813, 814, 815 and 816.

The current from current source 801 can either follow a path through circuits 811, 812 and 813 to current sink 802 or it can follow a path through circuits 814, 815 and 816 to current sink 802. The current is directed through circuits 811, 812 and 813 when the A input is a binary zero and the current is directed through circuitry 814, 815 and 816 when the A input is a binary one. This is done by circuits 811, 813, 814 and 816. Circuit elements 811 and 813 are superconducting when the A input is a binary zero and resistive when the A input is a binary zero. Circuit elements 814 and 816 are superconducting when the A input is a binary one and resistive when the A input is a binary zero.

Circuits 812 and 815 are similar to the circuits shown in FIGURE 2*a*. Circuit 812 has four circuit elements 821, 822, 823 and 824 which are selectively made resistive and superconducting in response to the carry input and D input signals. Circuit 815 has four circuit elements 851, 852, 853 and 854 which are selectively made resistive and superconducting in response to the carry input and D input signals. The circuitry in circuit elements 821, 822, 823 and 824 is similar to the circuitry previously described in circuit elements I, II, III and IV of the circuit of FIGURE 2*a*. The specific circuitry in circuit elements 821, 822, 823 and 824 is chosen so that the current in output line 825 represents the function specified by the chart of FIGURE 7*b* and the specific circuits in circuit elements 851 to 854 are chosen so that the current in output line 855 represents the function specified by the chart of FIGURE 7*a*. With the circuit of FIGURE 8*a*, the carry output signal is on line 825 when the A input is a binary zero and the carry output signal is on line 855 when the A input is a binary one. This difficulty is eliminated with the circuitry of FIGURE 8*b*.

Figure 8B:
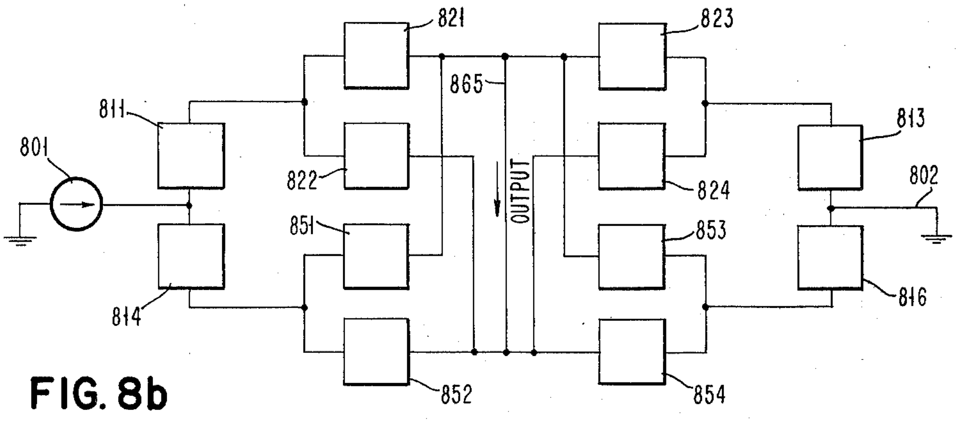
FIGURE 8b is a schematic diagram of the circuit shown in FIGURE 8a slightly modified.

The circuit of FIGURE 8*b* combines circuits 812 and 815 such that their essential character is not destroyed, but so that the output lines 825 and 855 are combined into one output line 865. The circuit elements 811, 813, 814 and 816 of the circuit of FIGURE 8*b* are identical to the circuit elements 811, 813, 814 and 816, in the circuit of FIGURE 8*a*. Likewise circuit elements 821 to 824 and 851 to 854 in the circuit of FIGURE 8*b* are identical to the circuit elements 821 to 824 and 851 to 854 in the circuit of FIGURE 8*a*. The only difference between the circuit of FIGURE 8*b* and the circuit of FIGURE 8*a* is that in the circuit of FIGURE 8*b* the two output lines 825 and 855 which are shown in the circuit of FIGURE 8*a* are combined into a single output line 865. Hence, the current in output line 865 represents the carry output of a bit adder when the augend input (A input), the addend input (D input) and the carry input assume the various possible values.

A complete detailed circuit diagram of a circuit for generating the carry output of a bit adder is shown in FIGURE 9*b*. The cryotrons in circuits 811, 813, 814 and 816 which direct the current into circuits 812 and 815 are shown and likewise the cryotrons in each of the circuits 821 to 824 and circuits 851 to 854 are shown. The characteristics of each of the cryotrons shown in FIGURE 9*b* is shown in FIGURE 9*a*.

Each of the circuits 811, 813, 814, 816, 821, 823, 824, 851, 852 and 853 merely have one cryotron. Circuits 822 and 854 each have two cryotrons connected in parallel. The cryotrons in circuits 811, 813, 814 and 816 have two control lines. The first control line is activated by the A input and the second control line is activated by a fixed bias. The operation of the cryotrons in circuits 811, 813, 814 and 816 is similar to the operation of the previously described cryotrons and the operation of the cryotrons in circuits 811, 813, 814 and 816 is described by the previously given Equation (a). That is, when the magnitude of the algebraic sum of the currents in the control reads two the gate of the cryotrons becomes resistive. For example, the cryotron in circuit 814 is resistive only when the signal in the A input has a magnitude of minus one such that the algebraic sum of the current in the control lines is plus two, the absolute magnitude of which is naturally equal to plus two. Hence the cryotron is made resistive according to Equation (a) above.

Figure 9A:
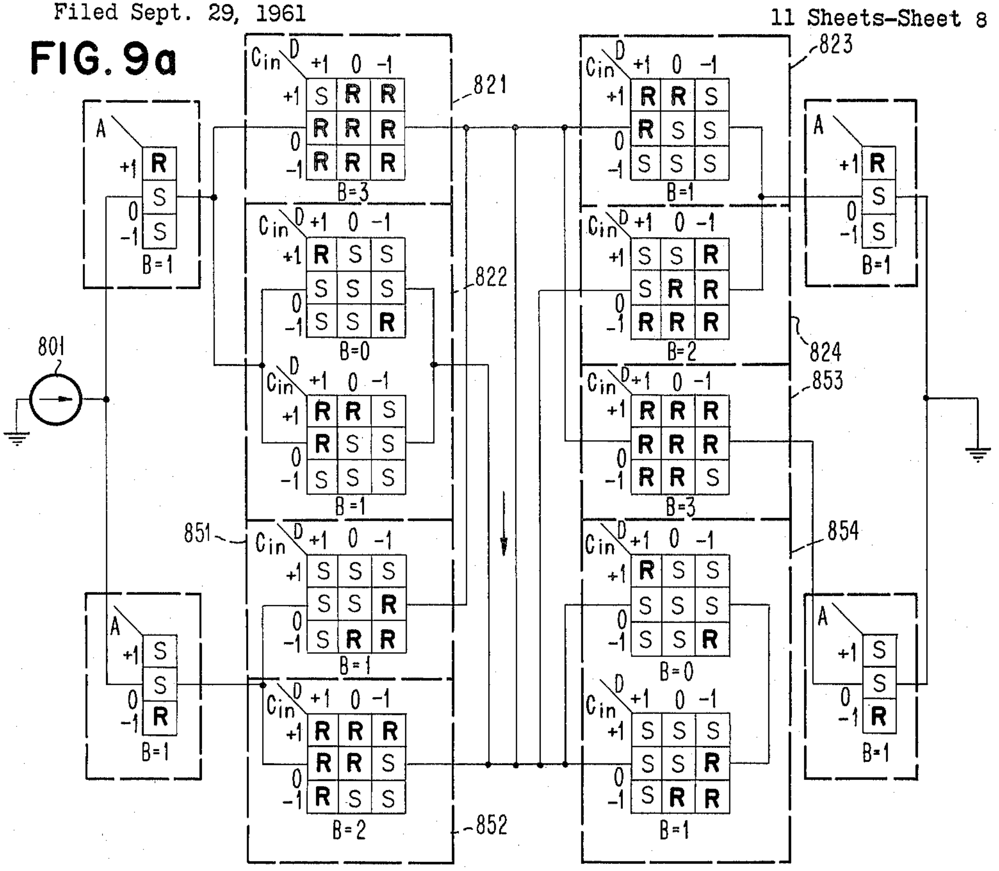
FIGURE 9a is a diagram showing the functions needed in the various blocks of the circuit shown in FIGURE 8b in order to produce the carry function as specified by the tables of FIGURES 7a and 7b.

The characteristics of each of the cryotrons in circuits 811, 821 to 824, 813, 814, 851 to 854 and 816 is shown in FIGURE 9*a*. The charts which show the characteristics of the cryotrons in circuits 811, 813, 814 and 816 merely have one column since the cryotrons in circuits 811, 813, 814 and 816 only have one control line. The one control line (i.e., the A input) has three possible states, and the single column of the charts specifies whether the cryotron is resistive or superconducting for each of the three possible conditions of the input line A. The charts which specify the characteristics of the cryotrons in circuits 821 to 824 and 851 to 854 are similar to the charts previously described.

Each of the cryotrons in circuits 821 to 824 and 851 to 854 has three control lines. One control line is connected to the carry input line, one control line is connected to the D input line, and the third control is connected to a fixed bias current. No connections are shown in FIGURE 9*b* to the bias current lines of the cryotrons since current sources which emit currents of constant magnitude are well known.

The circuit shown in FIGURE 9*b* operates by receiving either positive or negative currents on the A input line and on the D input line and either positive, negative or no current on the carry input line. The circuit operates so as to produce either a positive, negative or no current on output line 865. The current on the A input is positive when the augend digit A is a binary one and is negative when the augend digit A is a binary zero. The current in the D input is positive when the addend digit D is a binary one and negative when the addend digit D is a binary zero. The current on the carry input line is positive when the carry input is a binary one, negative when the carry input is a binary zero and there is no current on the carry input when the carry input is in the null condition (indicated by a question mark in FIGURE 1*b* and a zero in FIGURES 7*a* and 7*b*). The current in output line 865 is positive when the carry output is a binary one, negative when the carry output is a binary zero, and there is no current in the output line 865 when the carry output is in the null condition. The positive direction of current in the various lines is indicated by arrows on the lines.

Two terminals 898 and 899 are shown connected in series with output line 865. The two terminals 898 and 899 are connected by line 897. The control lines for all of the cryotrons which the circuit shown in FIGURE 9*b* controls are connected in series between the terminals 898 and 899. In FIGURE 1*a* the carry lines C1–2 to C4–5 are represented as single lines. Each of these lines represents a line such as line 897 which is connected between terminals 898 and 899. The circuit shown in FIGURE 9*b* has a terminal marked carry input. This terminal is the terminal 898 from the carry generating circuit in the previous binary order. The circuit shown in FIGURE 9*b* has a terminal 896 connected to the other end of the line which is connected to the carry input terminal. Terminal 896 is connected to terminal 899 of the carry generating circuit in the previous binary order.

Each of the bit adder circuits has separate circuitry (shown in FIGURE 10*b*) for generating the sum output. The circuit shown in FIGURE 10*b* generates the binary function specified in the last column of the chart of FIGURE 1*b*. That is, the circuit generates a positive current (current in the downward direction) in output line 1065 when the sum output is a binary one, negative current in output line 1065 when the sum output is a binary zero. As previously stated, the state of the current in output line 1065 for the various possible combinations of relevant inputs is specified by the charts of FIGURES 7*c* and 7*d*.

The chart of FIGURE 7*c* specifies the condition of the current in the sum output line of a bit adder for the various possible conditions current in the carry input line and the D input line (the addend input) when the A input (the aguend input) is a binary one, and the chart of FIGURE 7*d* specifies the value of the current in the sum output line of a bit adder for the various possible conditions of carry input and the D input when the A input is a binary zero. The general circuit diagrams shown in FIGURES 8*a* and 8*b* for the circuitry which generates the carry output are equally applicable to the circuit which generates the sum output. However, in the circuit for generating the sum output (FIGURE 10*b*) the specific circuitry in the blocks 821 to 824 and 851 to 854 is designed in accordance with the charts in FIGURES 7*c* and 7*d* whereas in the circuit for generating the carry output (FIGURE 10*b*) the specific circuitry in circuit elements 821 to 824 and 851 to 854 is designed in accordance with the charts of FIGURES 7*a* and 7*b*.

The circuit shown in FIGURE 10*b* can best be understood with reference to the circuits shown in FIGURE 8*a*. The only difference between the organization of the circuit shown in 8*a* and the organization of the circuit shown in FIGURE 10*b* is that in the circuit shown in FIGURE 10*b* the output lines 825 and 855 are consolidated into one output line 1065. Circuits 1011, 1013, 1014, and 1016 are respectively identical to circuits 811, 813, 814 and 816 previously described. Hence, when the A input signal is a binary zero, current flows from current source 1001 to current sink 1002 through circuit elements 1011 and 1013, and when the A input is a binary one, the current from current source 1001 flows through circuit elements 1014 and 1016 to current sink 902. The circuit elements 1021 to 1024 are designed so that the current flows in the output line 1065 in the manner specified by the chart of FIGURE 7*d*, and the circuit element 1051 to 1054 are designed so that the current flows in the output line 1065 in a manner specified by the chart of FIGURE 7c. The characteristics of each of the cryotrons shown in the circuit of FIGURE 10*b* are shown in FIGURE 10*a*.

The output line 1065 has two terminals 1098 and 1099 connected in series therewith. The terminals 1098 and 1099 are connected by a line 1097. The control line for all of the cryotrons which output line 1065 controls are connected in series between terminals 1098 and 1099 and the line 1097 connected between terminals 1098 and 1099 represents this series connection. In FIGURE 1*a* the output lines S1 to S4 are shown as single lines. These single lines also represent the series connection between the terminal 1098 and 1099.

The adder control circuit 125 (shown in FIGURE 1*a*) will now be explained in detail with reference to FIGURES 11*a* to 11*e*. Control circuit 125 includes twelve cryotrons 1105 to 1116, two current sources 1125 and 1126, a "start addition" input terminal connected to input line 165, an "end of addition" output terminal connected to output line 166 and current paths 1151 to 1159 interconnecting the cryotrons 1105 to 1116, the current sources 1125 and 1126, the input 165, and the output line 166.

The function of control circuit 125 is (1) to detect when each of the bit adders 111 to 114 has completed its addition operation and (2) to activate output line 166 thereby gating the sum digits S1 to S4 through the gate 103 to the output circuitry 104 after each of the bit adders 111 to 114 has completed its addition operation.

Figure 11A:
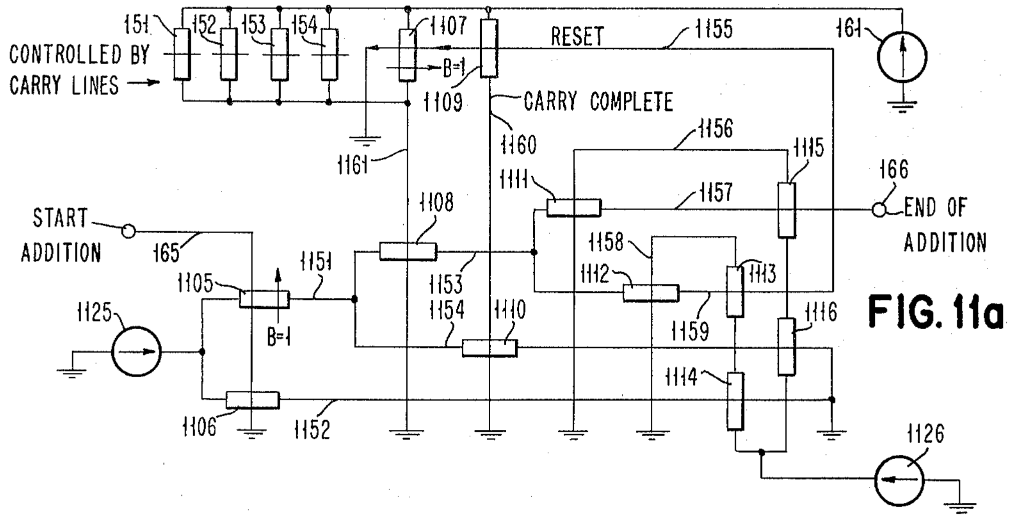
FIGURE 11a is a detailed circuit diagram of the control circuitry shown in FIGURE 1.
Figure 11B:
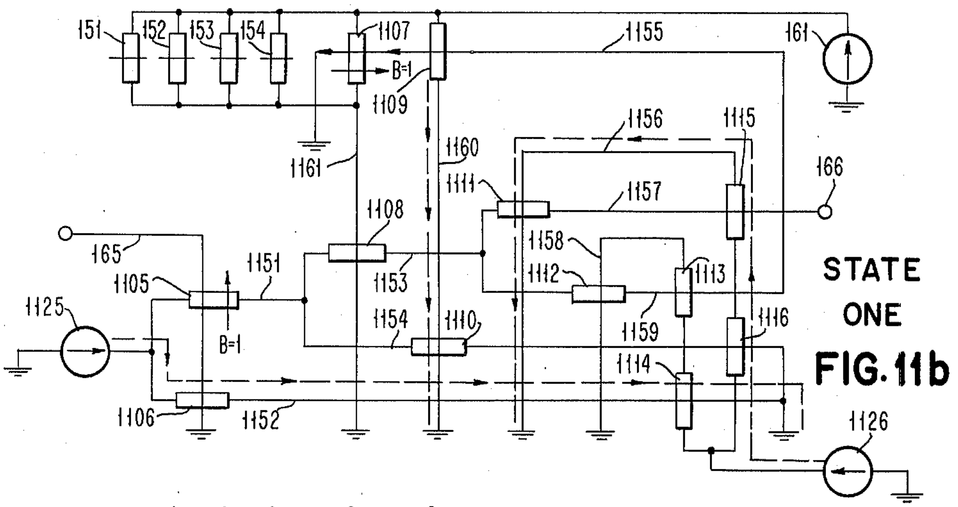
FIGURES 11b to 11e are circuit diagrams which show the various states which the control circuitry shown in FIGURE 11a assumes.

The paths through which the current from current sources 161, 1125 and 1126 flows before a start addition signal is applied to line 165 is shown by dotted arrows in FIGURE 11*b*. At the end of each addition, the cryotrons 151 to 154 are resistive. They are held resistive by the current in output lines C1–2 to C4–5 until the next addition operation begins. Cryotron 1109 is superconducting except when there is current in line 1155. Cryotron 1107 has a constant bias which maintains the cryotron gate 1107 resistive except when there is current in line 1155. At the beginning of each addition there is no current in line 1155 and hence cryotron 1107 and cryotrons 151 to 154 are resistive and cryotron 1109 is superconducting. Current from source 161 therefore flows in line 1160. Cryotron 1105 is biased normally resistive. The only time that cryotron 1105 is superconducting is when there is current in current path 165. Hence, at the beginning of an addition before a start addition current is applied to the circuit through line 165 cryotron 1105 is resistive and the current from current source 1125 flows in current path 1152. The current in current path 1152 makes cryotron 1114 resistive and therefore the current from current source 1126 flows in current path 1158.

Figure 11C:
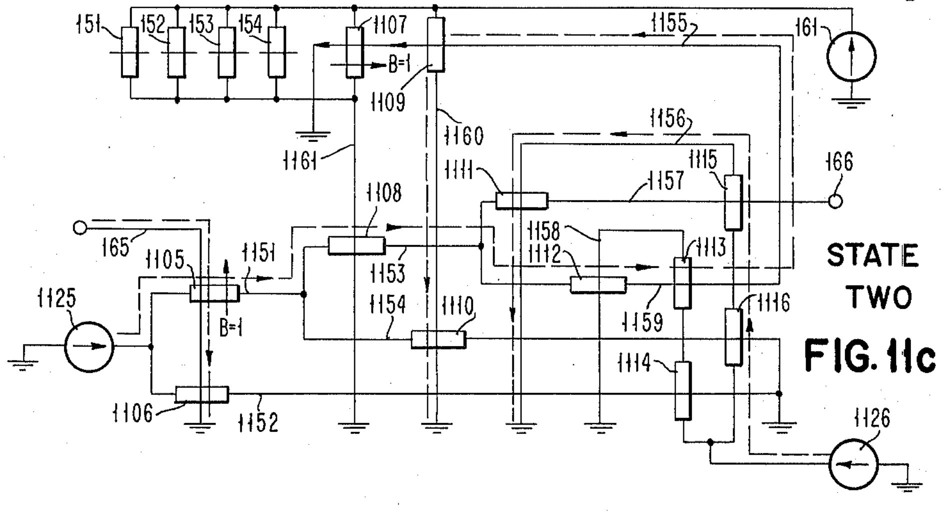

The paths through which the current flows in the circuit immediately after line 165 is activated by a start addition current is shown by dotted arrows in FIGURE 11*c*. Activation of line 165 makes cryotron 1105 superconducting and cryotron 1106 resistive. Hence, current from current source 1125 flows in current path 1151. The current in current path 1160 makes cryotron 1110 resistive and hence the current from current path 1151 flows in current path 1153. The current in current path 1156 makes cryotron 1111 resistive and hence the current from current path 1153 flows through current path 1159 to current path 1155.

Figure 11D:
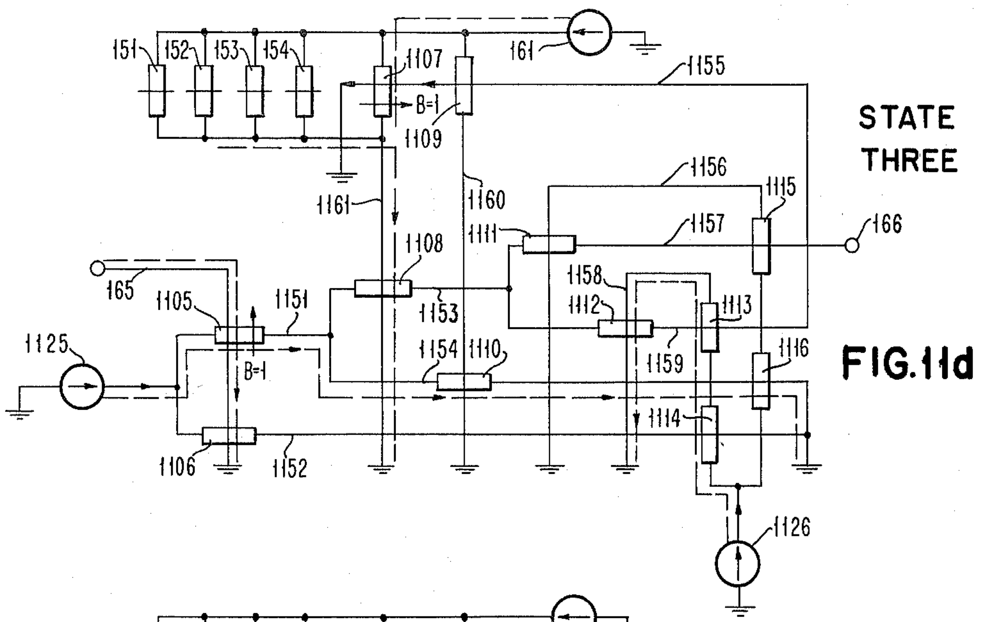

The current in current path 1155 changes the state of the circuit. The third state of the circuit is shown in FIGURE 11*d*. Current in current path 1155 makes cryotron 1109 resistive and cryotron 1107 superconducting. Hence, current from current source 161 is shifted from current path 1160 to current path 1161. The current in current path 1161 makes cryotron 1108 resistive thereby shifting current from current path 1153 to current path 1154. The current in current path 1154 makes cryotron 1116 resistive thereby shifting the current which comes from current source 1126 from current path 1156 to current path 1158.

It should be noted that the change from state two to state three was initiated by current in path 1155. At the beginning of the state three, the current from current source 161 flows through cryotron 1107 to current path 1161. It should be noted, however, that at the same time that a start addition pulse is applied to line 161 the augend and addend digits are gated from input circuitry 101 through gate 102 to bit adders 111 to 114. The signals from the input circuitry changes the state of the carry output circuitry in the bit adders and current ceases to flow in some of the lines C1–2 to C4–5. Hence, certain of the cryotrons 151 to 154 become superconducting. After current ceases to flow in current path 1155 cryotron 1107 becomes resistive and the current from current source 161 flows through the cryotrons 151 to 154 to current path 1161 and the circuit stays in state three (shown in FIGURE 11*d*) until all of the cryotrons 151 to 154 become resistive.

Figure 11E:
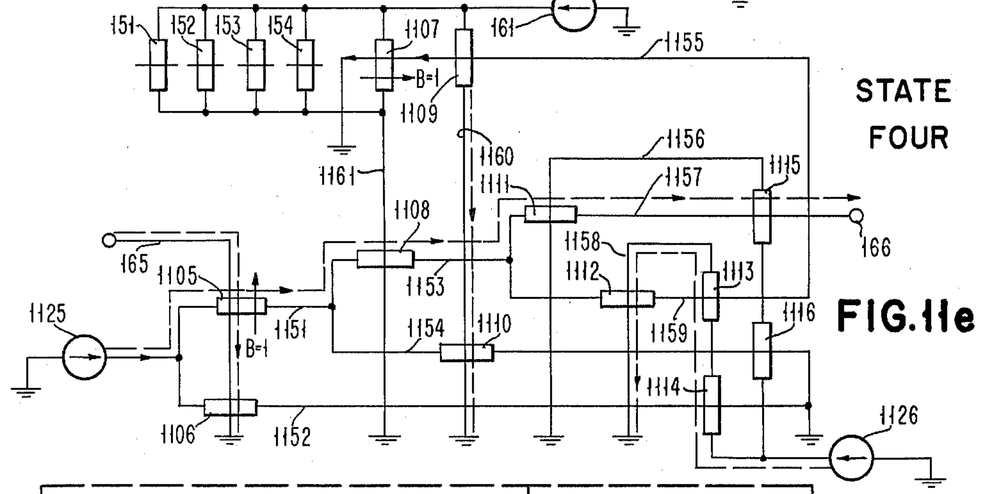

After each of the cryotrons 151 to 154 is made resistive by current in the output lines C1–2 to C4–5 the current is shifted from current path 1161 to current path 1160. This is shown in FIGURE 11*e*. Current in current path 1160 causes cryotron 1110 to become resistive and the current is switched from current path 1154 to current path 1153. The current in current path 1158 makes cryotron 1112 resistive and hence the current from current path 1153 flows in current path 1157 to the output line 166 thereby indicating the end of an addition. Current continues to flow in current path 1157 to output line 166 as long as the current is applied to the start addition line 165. After the current flow in line 165 is terminated cryotron 1105 becomes resistive and the current from current source 1125 flows in path 1152 rather than in path 1151. The circuit thereby returns to state one (shown in FIGURE 11*b*).

The details of the circuitry in input circuit 101, gates 102 and 103 will now be explained in detail. It should be understood that there is a separate gate circuit for each of the lines which enter circuits 102 and 103. Each of the individual gates in circuit 102 is activated by the same control line, and each of the individual gates in circuit 103 is activated by the same control line.

Figure 12:
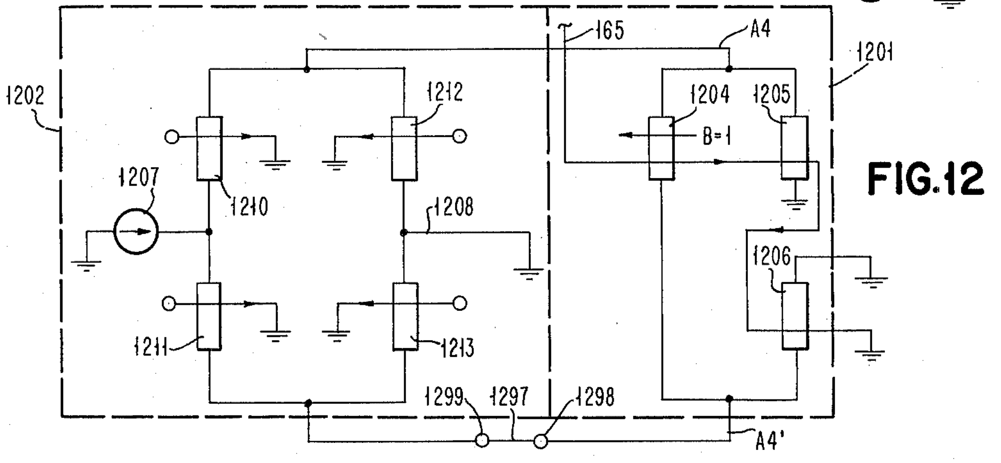
FIGURE 12 is a detailed circuit diagram of an input circuit and of a gate circuit.

The gate which is located between line A4 and line A4′ is given the designation 1201 and it is shown in detail in FIGURE 12. Each of the other lines A1 to A3, D1 to D4 and S1 to S4 has a gate similar to the gate 1201 which is shown in detail in FIGURE 12.

The gate 1201 which is connected between lines A4 and A4′ has three cryotrons 1204, 1205 and 1206. One of the controls for the cryotrons 1204 is connected to a bias line which maintains the cryotron 1204 normally resistive. The single control line on cryotrons 1205 and 1206 and the second control on cryotron 1204 is connected to input line 165.

A signal on line 165 causes cryotron 1204 to become superconducting and cryotrons 1205 and 1206 to become resistive. When cryotron 1204 is superconducting and cryotrons 1205 and 1206 are resistive, signals on line A1 do propagate to line A1′, whereas, when cryotron 1204 is resistive and cryotrons 1205 and 1206 are superconducting signals on line A1 do not propagate to line A1′.

The circuit 1202 shown in FIGURE 12 is the input circuitry in input circuit 101 which is associated with the line A4. Each of the other lines A1 to A3 and D1 to D4 has circuitry similar to the circuit 1202. The circuit in circuitry 101 which is associated with line A1 has a current source 1207, a current sink 1208 and four cryotrons 1210, 1211, 1212 and 1213 connected as shown in FIGURE 12. The input A4 is set to the binary one condition by activating the control lines for cryotrons 1211 and 1212 and by not activating the control lines of cryotrons 1210 and 1213. The gate conductors of cryotrons 1211 and 1212 is thereby made resistive. When cryotrons 1211 and 1212 are resistive, the current from current source 1207 flows through the gate conductor of cryotron 1210, through lines A4 to A4′, through the gate conductor of cryotrons 1213 to current sink 1208. The input A4 is set to the binary zero condition by activating the control line for cryotrons 1210 and 1213 and by not activating the control line for cryotrons 1211 and 1212. The gate conductor of cryotrons 1210 and 1213 is thereby made resistive. When the gate conductors of cryotrons 1210 and 1213 are resistive, the current from current source 1207 flows through the gate conductor of cryotron 1211, through lines A4′ and A4 through the gate conductor of cryotron 1212 to the current sink 1208.

The gate circuit 1201 in FIGURE 12 has two terminals marked 1298 and 1299 connected in series with the output line A4′. The terminals 1298 and 1299 are shown connected by a line 1297. The control line for each of the cryotrons which the line A4′ controls are connected in series between terminals 1298 and 1299. For example, the circuit shown in FIGURE 9*b* has a terminal marked A input and a terminal on the other end of the line connected to the A input marked 896. The A input terminal is connected to terminal 1298 of the associated gate circuit and the terminal 896 is connected to terminal 1299 of the associated gate circuit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for generating the carry function of an augend digit, an addend digit, and a carry digit, said carry function having binary one, binary zero and intermediate states, said augend and addend digits having binary one and binary zero states, said carry digit having binary one, binary zero and indeterminate states;

an augend digit input line;

an addend digit input line;

a carry digit input line;

the binary one state of an augend digit, an addend digit, and of a carry digit being indicated by positive current in the associated input line, the binary zero state of an augend digit, an addend digit, and a carry digit being indicated by negative current in the associated input line, the indeterminate state of a carry digit being indicated by no current in the associated input line;

a current source;

a current sink;

a carry function output line having first and second ends;

means responsive to said augend digit input line, to said addend digit input line and to said carry digit input line for providing a low resistance path between the first end of said carry function output line and said current source, and for providing a low resistance path between the second end of said carry function output line and said current sink when at least two of said inputs are in the binary one state;

means responsive to said augend digit input line, to said addend digit input line and to said carry digit input line for providing a low resistance path between the second end of said carry function output line and said current source, and for providing a low resistance path between the first end of said carry function output line and said current sink when at least two of said inputs are in the binary zero state; and means excluding said carry function output line for providing a low resistance path between said current source and said current sink when one of said inputs is in the binary one state and said carry input is in the indeterminate state;

whereby the current in said carry function output line flows in a first direction when said carry function is in the one state, in the opposite direction when said carry function is in the zero state, and no current flows in said output line when said carry function is in the indeterminate state.

2. A circuit for generating a binary function F of two binary variables W and Z, a W signal input, a Z signal input, a current source, a current sink, an output line, positive current on said W and Z inputs, indicating that said W and Z variables are one, negative current on said W and Z inputs indicating that said W and Z variables are zero, and no current on said W and Z inputs indicating that the W and Z variables are as yet undetermined, first, second, third and fourth circuit elements connected together in a closed loop, said current source connected between said first and second circuit elements, said current sink connected between said third and fourth circuit elements, said output line connected from between said first and third circuit elements to between said second and fourth circuit elements, said circuit elements being responsive to said W and Z inputs, said first and fourth circuit elements being conductive when function, F, is one and resistive when said function, F, is zero, said second and third circuit elements being conductive when said function, F, is zero and resistive when said function, F, is one, said first and third circuit elements being resistive and said second and fourth circuit elements being superconducting when said function, F, is as yet undetermined, whereby current flows through output line in a positive direction when said function, F, is one, in a negative direction when said function, F, is zero, and no current flows through said output line when said function, F, is as yet undetermined.

3. An asynchronous binary computing system comprising:

a plurality of units for performing logical operations, each of said units having an output line, a positive current in said output line indicating a first binary state, a negative current in said output line indicating a second binary state, and no current in said output line indicating that the output is as yet undetermined;

a cryotron gate associated with each unit, each of said cryotron gates having a control line, the magnetic field generated by current in the control line associated with a cryotron gate causing the cryotron gate to become resistive, the output line of each of said units being connected in series with the control line of the associated cryotron gate;

whereby the cryotron gate associated with each unit is resistive if the output of the unit is in the binary one or the binary zero states, and whereby the cryotron gate associated with each unit is superconducting if the output of the unit is undetermined; and a control circuit having all of said cryotrons connected in parallel between a control circuit input line and a control circuit output line;

whereby current applied to said control circuit input line is blocked from reaching said control circuit output line by a resistive cryotron gate except when each of said units has a binary one or a binary zero output.

4. An asynchronous binary adder comprising:

a plurality of binary bit adders, each associated with a different binary order, each bit adder having a carry output line and a sum output line;

input means for supplying corresponding binary augend and binary addend bits to each of said bit adders;

said bit adders including means for activating the associated sum output line and the associated carry output line in response to the augend and addend bits supplied by said input means and to carry bits from the bit adder associated with the next lower digital order;

the two binary states being indicated on a carry output line by positive current and negative current, no current in a carry output line indicating that the associated bit adder has as yet not determined the carry output;

a cryotron gate associated with each bit adder, each of said cryotron gates having an associated control line, the magnetic field generated by current in the control line associated with a cryotron gate being able to cause the gate to become resistive, the carry output line of each of said adders being connected in series with the control line of the associated cryotron gate;

whereby the cryotron gate associated with each bit adder is resistive if the carry output of the bit adder is a binary one or a binary zero, and whereby the cryotron gate associated with each bit adder is superconducting if the output of the bit adder is undetermined; and a control circuit having all of said cryotrons connected in parallel between a control circuit input line and a control circuit output line;

whereby current applied to said control circuit input line is blocked from reaching said control circuit output line by a resistive cryotron gate except when the carry output of each of said bit adders is a binary one or a binary zero.

5. An asynchronous binary computing system having a computing element:

a plurality of input lines for supplying binary signals to said element, said computing element having an output line and means for generating on said output line some binary function of the binary signals on said input lines, the first binary state of said binary function being represented by positive current in said output line, the second binary state of said function being represented by negative current on said output line, and no current in said output line indicating that said computing element has not completed the generation of said function, means responsive to current in said output line for detecting when said computing element has completed generating said function, said detecting means comprising;

a cryotron gate which is normally superconducting, a control line for said cryotron gate connected in series with said output line, said cryotron gate being made resistive by the magnetic field caused by current in said control line, whereby said cryotron gate is resistive when the output of said computing element is either in the first binary state or in the second binary state, and whereby said cryotron gate is superconducting when said computing element has not completed the generation of said function.

6. An asynchronous binary adder system comprising:

operand storage means for storing the binary bits of an augend and the binary bits of an addend, said storage means having an adder augend input line for each bit of said augend and an adder addend bit input line for each bit of said addend;

a binary one being indicated on an adder input line by positive current in said line and a binary zero being indicated on an adder input line by negative current in said line;

a plurality of adders, one for each binary order of said operands, each of said adders having a carry output line and a sum output line, each of said adders being responsive to one adder augend bit input line, to one adder addend bit input line, and to the carry output line of the adder in the next lower binary order;

a binary one being indicated on said carry output lines and on said sum output lines by positive current in the respective line and a binary zero being indicated on said carry output lines and on said sum output lines by negative current in the respective line;

the condition with no current in a carry output line indicating that the carry output is as yet undetermined;

detection means for detecting the presence of current in each of said carry output lines;

system output means;

gating means for gating the signals on said sum output lines to said system output means;

control means responsive to said detection means for activating said gating means;

whereby the sum output from each of said adders is gated to said system output means when the carry output of each one of said bit adders is in either the binary one or the binary zero state.

7. The device recited in claim 6 wherein said detection means comprises:

a cryotron associated with each of said adders, said cryotrons having a normally superconducting cryotron gate and a control line, the magnetic field generated by current in the control line of a cryotron being able to cause the gate of the cryotron to become resistive;

the control line of each of said cryotrons being connected in series with the carry output line of the associated adder;

whereby each cryotron gate is superconducting when the carry output of the associated adder is undetermined and each cryotron gate is resistive when the carry output of the associated adder is either a binary one or a binary zero.

8. The device recited in claim 6 wherein said detection means and said control means comprise:

a cryotron associated with each of said adders, said cryotrons having a normally superconducting cryotron gate and a control line, the magnetic field generated by current in the control line of a cryotron being able to cause the gate of the cryotron to become resistive;

the control line of each of said cryotrons being connected in series with the carry output line of the associated adder;

whereby each cryotron gate is superconducting when the carry output of the associated adder is undetermined and each cryotron is resistive when the carry output of the associated adder is either a binary one or a binary zero;

a control circuit having the gate conductors of all of said cryotrons connected in parallel between a control circuit input line and a control circuit output line;

whereby current applied to said control circuit input line is blocked from reaching said control circuit output line by a resistive cryotron gate except when the carry output of each of said adders is either a binary one or a binary zero; and means responsive to current in said control circuit output line for activating said gating means;

whereby the sum output from each of said adders is gated to said system output means when the carry output of each unit of said bit adders is either a binary one or a binary zero.

References Cited by the Examiner

UNITED STATES PATENTS

| | | | |
|---|---|---|---|
| 3,004,705 | 10/1961 | Bremer | 235—175 X |
| 3,014,661 | 12/1961 | Anderson | 235—176 |
| 3,051,387 | 8/1962 | Pomerene et al. | 235—175 |
| 3,053,451 | 9/1962 | Mackay | 235—175 |
| 3,058,656 | 10/1962 | Pomerene | 235—175 |
| 3,154,675 | 10/1964 | Homan | 235—104 |

OTHER REFERENCES

"A Binary, Parallel, Asynchronous Arithmetic Unit With Separate Carry or Borrow Storage" by Gernot Metze, 8 pages, University of Illinois, Digital Computer Laboratory.

ROBERT C. BAILEY, *Primary Examiner.*

WALTER W. BURNS, Jr., *Examiner.*

P. J. HENON, M. A. LERNER, *Assistant Examiners.*